United States Patent
Sano et al.

(10) Patent No.: US 8,428,663 B2
(45) Date of Patent: Apr. 23, 2013

(54) SLIDE ROTATION DEVICE, SLIDE ROTATION METHOD, AND PORTABLE TERMINAL DEVICE

(75) Inventors: Tatsuya Sano, Tokyo (JP); Sojiro Terayama, Saitama (JP); Masao Matsumoto, Tokyo (JP)

(73) Assignee: Sony Mobile Communications AB, Lund (SE)

( * ) Notice: Subject to any disclaimer, the term of this patent is extended or adjusted under 35 U.S.C. 154(b) by 173 days.

(21) Appl. No.: 12/891,081

(22) Filed: Sep. 27, 2010

(65) Prior Publication Data

US 2011/0162470 A1   Jul. 7, 2011

(30) Foreign Application Priority Data

Jan. 6, 2010   (JP) .................. 2010-001596
Jun. 21, 2010  (JP) .................. 2010-141074

(51) Int. Cl.
*H04M 1/00*   (2006.01)

(52) U.S. Cl.
USPC .......... 455/575.1; 455/575.2; 455/575.3; 455/347

(58) Field of Classification Search ........... 455/575.1, 455/575.2, 575.3, 575.4, 347, 90.1; 379/428.01, 379/433.01, 433.12, 433.13
See application file for complete search history.

(56) References Cited

U.S. PATENT DOCUMENTS

| 2004/0092247 A1* | 5/2004 | Tani ........................... 455/410 |
| 2005/0044665 A1* | 3/2005 | Kuramochi .................... 16/341 |
| 2006/0216977 A1* | 9/2006 | Kato ........................... 439/157 |
| 2009/0227301 A1  | 9/2009 | Lindvall |

FOREIGN PATENT DOCUMENTS

| JP | 2009-267614 | 11/2009 |
| WO | WO 2009/038375 A2 | 3/2009 |
| WO | WO 2009/123406 A2 | 10/2009 |

OTHER PUBLICATIONS

U.S. Appl. No. 12/815,765, filed Jun. 15, 2010, Sano, et al.
Extended European Search Report issued Apr. 20, 2011, in Patent Application No. 10189925.0.
U.S. Appl. No. 13/597,736, filed Aug. 29, 2012, Sano.
U.S. Appl. No. 13/572,056, filed Aug. 10, 2012, Sano.

* cited by examiner

*Primary Examiner* — Jean Gelin
(74) *Attorney, Agent, or Firm* — Oblon, Spivak, McClelland, Maier & Neustadt, L.L.P.

(57) ABSTRACT

A slide rotation device includes a rail portion that is provided along a sliding direction of an upper case, a slide mechanism that has a slide assistance plate sliding the upper case along the rail portion of the upper case, and a rotation mechanism that is provided to be fixed in the vicinity of one end portion of a lower case and rotatably supports the slide assistance plate using a rotation shaft positioned in an extending direction of the slide assistance plate.

11 Claims, 16 Drawing Sheets

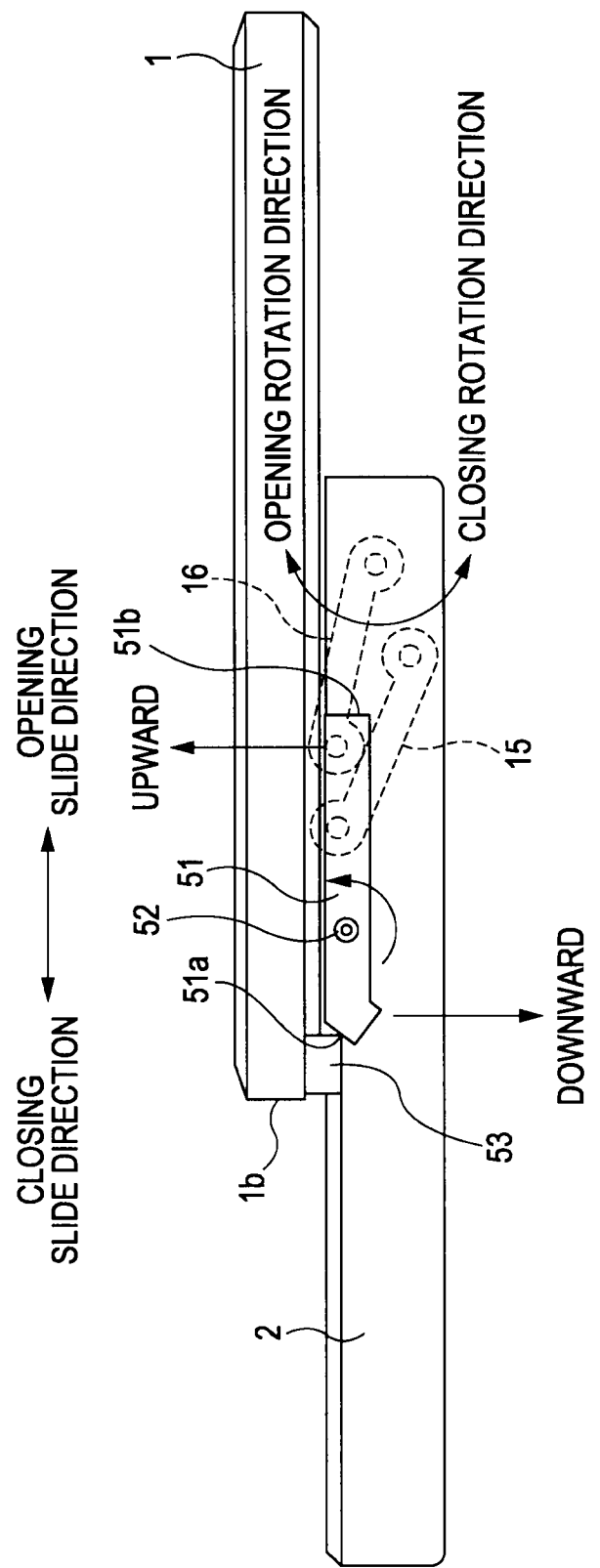

SLIDE ROTATION DEVICE, SLIDE ROTATION METHOD, AND PORTABLE TERMINAL DEVICE

BACKGROUND OF THE INVENTION

1. Field of the Invention

The present invention relates to a slide rotation device which can be applied to a portable device such as a portable phone, a PHS (Personal Handyphone System) phone, a PDA (Personal Digital Assistant), or a portable game machine, a slide rotation method, and a portable terminal device.

2. Description of the Related Art

In recent times, so-called straight-type portable devices in which the display unit and the operation unit are provided in a single case, and portable devices which are carried in a state where an upper case provided with the display unit and the like and a lower case provided with the operation unit and the like overlap each other, have been used.

In addition, as portable devices which are carried in a state where the upper case provided with the display unit and the like and the lower case provided with the operation unit overlap each other, so-called clamshell-type portable devices in which the upper case and the lower case are connected to rotate relative to each other via a hinge portion, and so-called slide-type portable devices in which the upper case and the lower case slide relative to each other along their respective longitudinal directions like a portable device disclosed in Japanese Unexamined Patent Application Publication No. 2009-267614 have been used.

SUMMARY OF THE INVENTION

Here, the applicant of the invention has developed a portable terminal device having both the slide-type and the clamshell-type functions, in which the upper case and the lower case slide along their respective lateral directions from a state where the upper case and the lower case overlap each other and the upper case rotates when the other end portion of the upper case in its lateral direction slides to the vicinity of one end of the lower case so that the upper case stands obliquely with respect to the lower case.

It is desirable to provide a slide rotation device which enables both the slide-type and the clamshell-type functions, a slide rotation method, and a portable terminal device having both the slide-type and the clamshell-type functions.

According to an embodiment of the invention, there is provided a slide rotation device including: a rail portion that is provided along the sliding direction of an upper case; a slide mechanism that has a slide assistance plate sliding the upper case along the rail portion of the upper case; and a rotation mechanism that is provided to be fixed to the vicinity of one end portion of the lower case and rotatably supports the slide assistance plate using a rotation shaft positioned in an extending direction of the slide assistance plate.

In addition, in an opening operation, the force in the opening slide direction is exerted on the upper case in a state where the upper case and the lower case overlap each other so as to slide the upper case in the opening slide direction via the rail portion and the slide assistance plate, and one end portion of the upper case comes in contact with the slide assistance plate, and, in this state, a force in the opening slide direction is exerted on the upper case to rotate the slide assistance plate in the opening rotation direction using the rotation mechanism, and thereby the upper case stands at a predetermined rotation angle with respect to the lower case via the slide assistance plate.

Also, in a closing operation, a force in the closing rotation direction reverse to the opening rotation direction is exerted on the upper case to put the upper case, which stands at a predetermined rotation angle with respect to the lower case, to be substantially parallel to the lower case using the rotation mechanism, and, in this state, a force in the closing slide direction reverse to the opening slide direction is exerted on the upper case to slide the upper case in the closing slide direction via the rail portion and the slide assistance plate, and thereby the upper case and the lower case overlap each other.

This enables both functions of a slide-type and a clamshell-type.

The slide rotation device according to an embodiment of the invention may further include a rotation assistance portion that assists the rotating of the upper case in the opening rotation direction by converting a force sliding in the opening slide direction into a force rotating in the opening rotation direction when the upper case is slid in the opening slide direction.

In this case, the rotation assistance portion converts a force sliding the upper case in the opening slide direction into a force rotating in the opening rotation direction to assist the rotating of the upper case in the opening rotation direction. Therefore, it is possible to transit the cases from sliding to rotating.

In addition, according to an embodiment of the invention, the slide rotation device may further include a rotation assistance portion that assists the rotating of the upper case in the opening rotation direction by moving toward the upper case due to a force sliding in the opening slide direction and pushing up the upper case when the upper case is slid in the opening slide direction.

In this case, the rotation assistance portion assists the rotating of the upper case in the opening rotation direction by moving toward the upper case due to a force sliding in the opening slide direction of the upper case and pushing up the upper case. Therefore, it is possible to smoothly transit the cases from sliding to rotating.

According to the embodiments of the invention, having both functions of a slide-type and a clamshell-type is enabled.

Also, according to the embodiments of the invention, a smooth transition from the sliding of the cases to the rotating of the upper case is enabled.

BRIEF DESCRIPTION OF THE DRAWINGS

FIG. 12 is a diagram for explaining a rotation assistance operation of the portable phone according to the fourth embodiment of the invention.

DESCRIPTION OF THE PREFERRED EMBODIMENTS

The invention may be applied to a portable phone.

First Embodiment

Configuration of Portable Phone

Figure 1A:
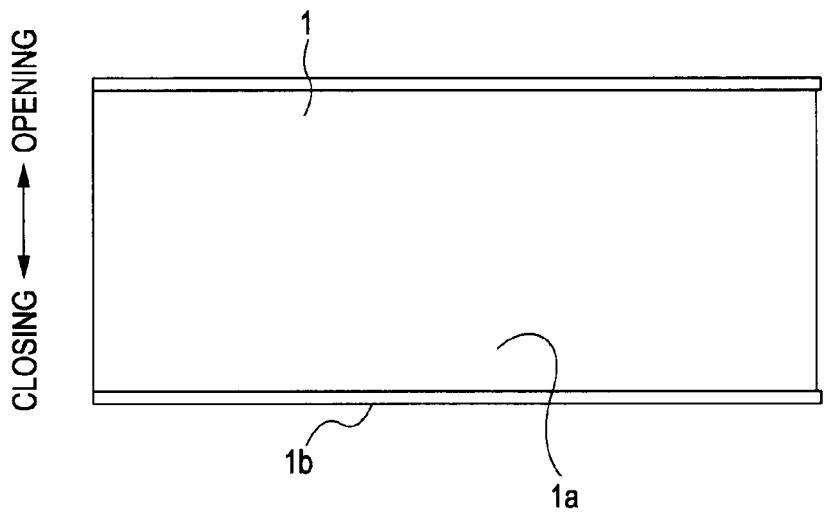
FIGS. 1A to 1C are diagrams illustrating a portable phone according to a first embodiment of the invention as viewed from the top and the side in a closed state, and as viewed from the side in an opened state, respectively.
Figure 1B:
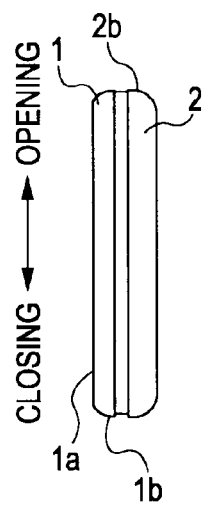
Figure 1C:
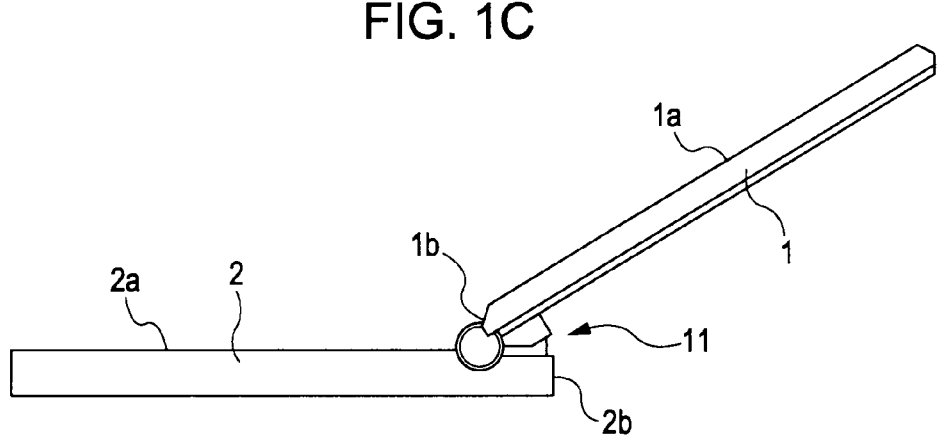

First, FIGS. 1A to 1C and FIG. 2 illustrate a portable phone according to a first embodiment of the invention. In the figures, FIG. 1A is a diagram illustrating the portable phone in a closed state as viewed from the upper case 1 side, FIG. 1B is a diagram illustrating the portable phone in the closed state as viewed end-on from a lateral side surface of the portable phone, and FIG. 1C is a diagram illustrating the portable phone in an opened state as viewed side-on.

As illustrated by FIGS. 1A to 1C and FIG. 2, the portable phone includes the upper case 1 which is substantially rectangular, and the lower case 2 which is rectangular with substantially the same size as that of the upper case 1.

The upper surface portion 1a of the upper case 1 (the surface portion opposite to the surface portion facing the lower case 2) is provided with a display unit such as a liquid crystal display unit or an organic EL (Organic Electro Luminescence) display unit, an auxiliary operation unit, and the like. The upper surface portion 2a of the lower case 2 (in a closed state, the surface portion opposite to the upper surface portion of the upper case 1) is provided with a main operation unit including a plurality of pressing operation keys, a rotating operation key, and the like.

Figure 2:
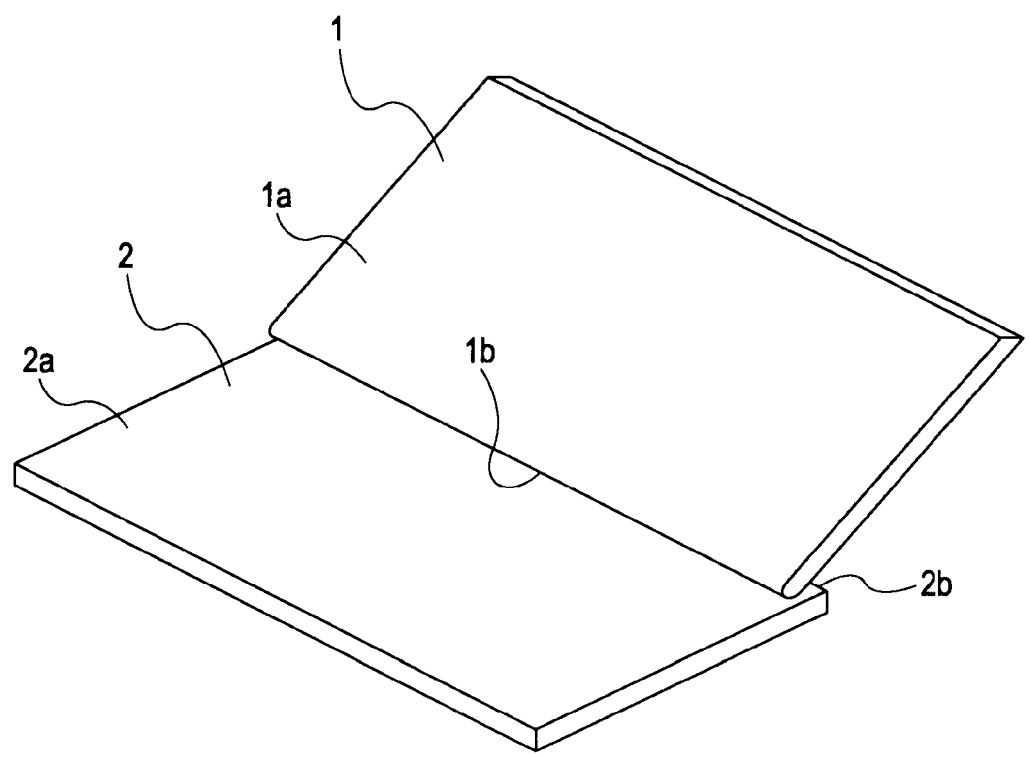
FIG. 2 is a perspective view of an opened state of the portable phone according to the first embodiment of the invention.

The display unit, the auxiliary operation unit, and the like provided in the upper surface portion 1a of the upper case 1 are typically exposed regardless of a slide position or a rotational position of each of the cases 1 and 2. In addition, the main operation unit and the like provided in the upper surface portion 2a of the lower case 2 are exposed when the portable terminal device is in the opened state as illustrated in FIG. 2.

Slide Rotation Mechanism

The portable phone has both functions of a slide-type and a clamshell-type in that as the upper and lower cases 1 and 2 slide in the opening slide direction along the lateral direction of each of the cases 1 and 2 from a closed state where the cases 1 and 2 entirely overlap each other, when the other end portion 1b of the upper case 1 in the lateral direction slides to a vicinity of one end portion 2b of the lower case 2, the upper case 1 rotates and stands obliquely with respect to the lower case 2.

Figure 3:
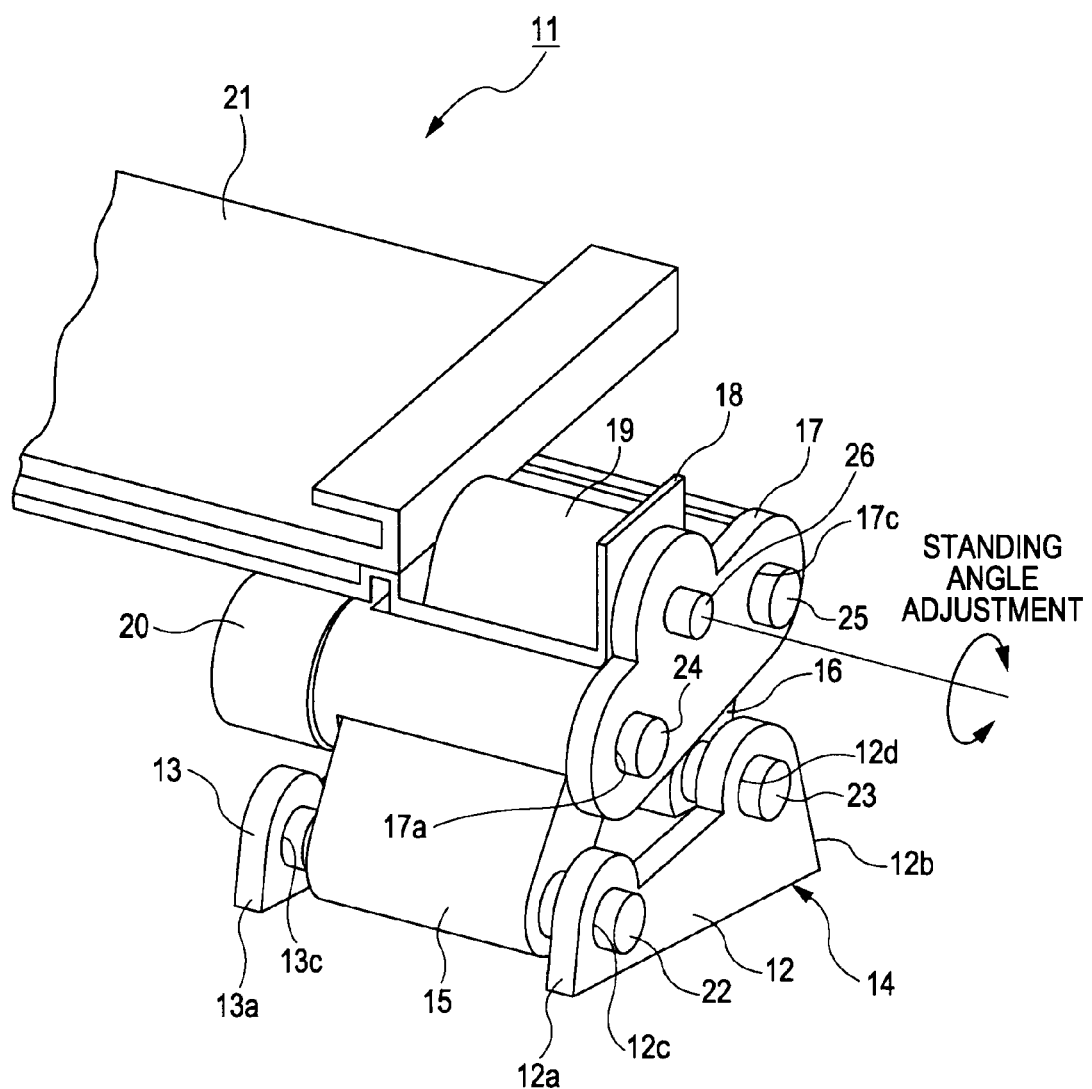
FIG. 3 is a perspective view of a slide rotation mechanism provided in the portable phone according to the first embodiment of the invention.
Figure 4:
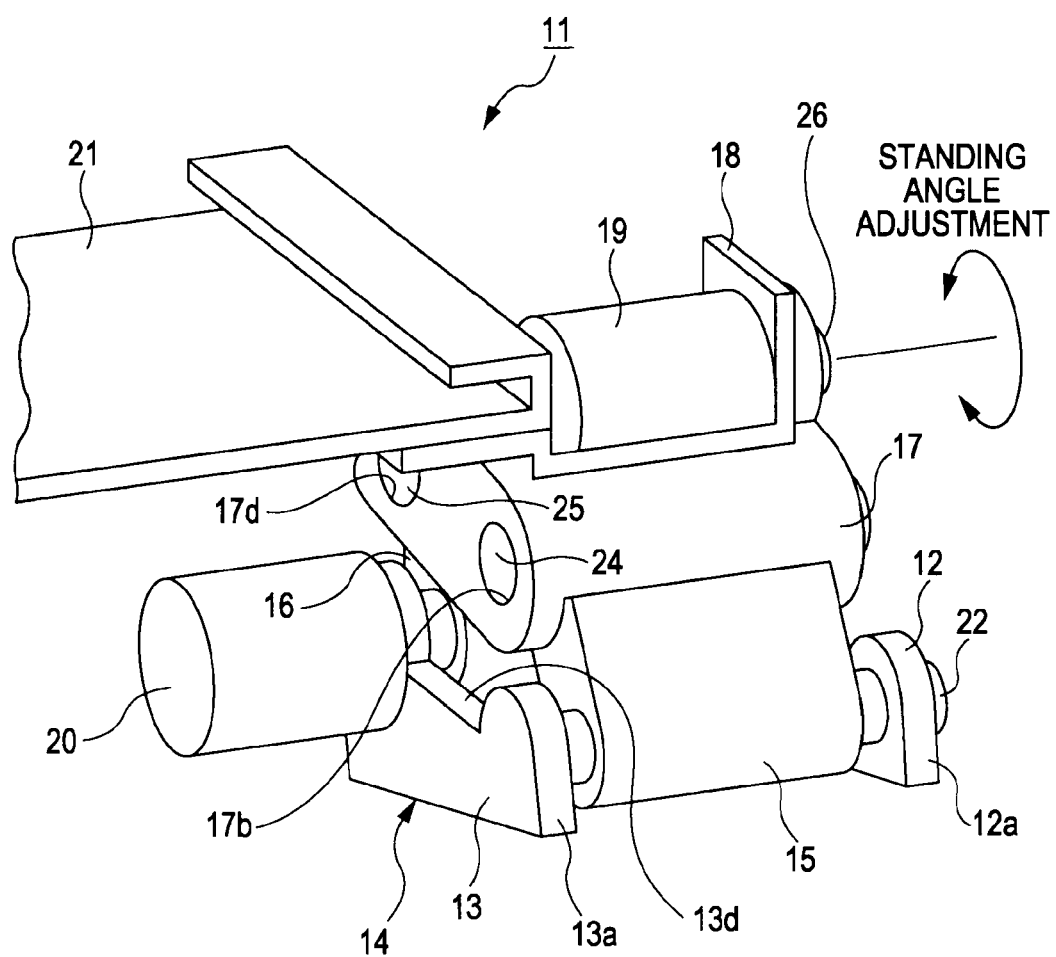
FIG. 4 is a perspective view of the slide rotation mechanism provided in the portable phone according to the first embodiment of the invention as viewed from another direction.

A slide rotation mechanism 11 illustrated in FIGS. 3 and 4 enables such a slide rotation operation. FIG. 3 is a diagram of the slide rotation mechanism 11 in the state where the upper case 1 stands obliquely with respect to the lower case 2 (the opened state of the portable phone) as viewed obliquely from right above. In addition, FIG. 4 is a diagram illustrating the slide rotation mechanism 11 in the state where the upper case 1 stands obliquely with respect to the lower case 2 (the opened state of the portable phone) as viewed obliquely from left above.

The portable phone includes a pair of the slide rotation mechanisms 11. One slide rotation mechanism 11 is provided on a right side of in the vicinity of the one end portion 2b of the lower case 2, and the other slide rotation mechanism 11 is provided on a left side of in the vicinity of the one end portion 2b of the lower case 2.

Moreover, in the description, the portable phone has a pair of the slide rotation mechanisms 11. However, the portable phone may include only one slide rotation mechanism 11.

As illustrated in FIGS. 3 and 4, the slide rotation mechanism 11 includes a base 14, a first arm 15, a second arm 16, an arm connection member 17, a fastening member 18, a free stop hinge portion 19, a click hinge portion 20, a slide assistance plate 21, and four rotation support pins 22 to 25.

The base 14 has a pair of support portions 12 and 13 with a substantially long plate shape. The base 14 is fixed to the side of the lower case 2. In the vicinity of one end portion 12a of one support portion 12 of the base 14, there is provided a pin insertion hole 12c through which the rotation support pin 22 is inserted. In the vicinity of the other end portion 12b of the one support portion 12, there is provided a pin insertion hole 12d through which the rotation support pin 23 is inserted. In the vicinity of one end portion 13a of the other support portion 13 of the base 14, there is provided a fitting recessed portion 13c to which an end portion of the rotation support pin 22 is fitted. In the vicinity of the other end portion 13b of the other support portion 13, there is provided a fitting recessed portion 13d to which an end portion of the rotation support pin 23 is fitted.

The overall-length of each of the first arm 15 and the second arm 16 are the same as each other, in this embodiment. One end portion of the first arm 15 is provided in the base 14 so as to be rotatably supported by the rotation support pin 22 which is inserted through the pin insertion hole 12c of the one support portion 12 and is fitted to the fitting recessed portion 13c of the other support portion 13.

Similarly, one end portion of the second arm 16 is provided in the base 14 so as to be rotatably supported by the rotation support pin 23 which is inserted through the pin insertion hole 12d of the one support portion 12 and is fitted to the fitting recessed portion 13d of the other support portion 13.

The support portion 12 of the base 14 is processed to be inclined upwardly (the upper case 1 side) from the one end portion 12a to the other portion 12b. In other words, the distance between the other portion 12b and the upper case 1 is shorter than the distance between the one end portion 12a and the upper case 1.

Similarly, the support portion 13 of the base 14 is also processed to be inclined upwardly (the upper case 1 side) from the one end portion 13a to the other portion 13b. In other words, the distance between the other portion 13b and the upper case 1 is shorter than the distance between the one end portion 13a and the upper case 1.

For this reason, when the portable phone is in an opened state described later, if the first arm 15 and the second arm 16 rotate and stand on the base 14, the second arm 16 is positioned at upper side than the first arm 15 since the respective support portions 12 and 13 of the base 14 are inclined. As a result, the end portion of the second arm 16 through which the rotation support pin 25 is inserted is positioned at a higher side than the end portion of the first arm 15 through which the rotation support pin 24 is inserted (refer to FIG. 3).

In addition, in this embodiment, the overall-length of each of the arms 15 and 16 is the same as each other and each of the support portions 12 and 13 of the base 14 is also processed to be inclined so that the end portion of the second arm 16 through which the rotation support pin 25 is inserted is positioned at a higher side than the end portion of the first arm 15 through which the rotation support pin 24 is inserted when the first arm 15 and the second arm 16 stand on the base 14. However, the overall-length of the second arm 16 may be made greater than the overall-length of the first arm 15, the one end portion 12a and the other end portion 12b of the support portion 12 of the base 14 may have the same height, and the one end portion 13a and the other end portion 13b of the support portion 13 may have the same height.

That is to say, the overall-length of the second arm 16 may be made greater than the overall-length of the first arm 15, and, further, each of the support portions 12 and 13 may not be inclined.

By this configuration as well, since the overall-length of the second arm 16 is greater than the overall-length of the first arm 15, when each of the arms 15 and 16 stands on the base 14, it is possible for the end portion of the second arm 16 through which the rotation support pin 25 is inserted to be positioned at higher side than the end portion of the first arm 15 through which the rotation support pin 24 is inserted.

Further, after each of the support portions 12 and 13 of the base 14 is formed to be inclined, the overall-length of the second arm 16 may be greater than the overall-length of the first arm 15. In this case, an inclined angle when the upper case 1 stands may be made large.

The arm connection member 17 connects the arms 15 and 16 so that the arms 15 and 16 are linked. That is to say, the arm connection member 17 includes pin insertion holes 17a and 17b which communicate with each other and pin insertion holes 17c and 17d which communicate with each other. The rotation support pin 24 is provided to allow the pin insertion holes 17a and 17b of the arm connection member 17 to communicate with each other, and the other end portion of the first arm 15 is rotatably supported by the rotation support pin 24. Similarly, the rotation support pin 25 is provided to allow the pin insertion holes 17c and 17d of the arm connection member 17 to communicate with each other, and the other end portion of the second arm 16 is rotatably supported by the rotation support pin 24.

The fastening member 18 is fixed to the slide assistance plate 21 provided along the longitudinal direction of the lower case 2. The fastening member 18 to which the slide assistance plate 21 is fixed is provided in the arm connection member 17 via a free stop pin 26 which is a rotation shaft of the free stop hinge portion 19. Accordingly, the fastening member 18 fixed to the slide assistance plate 21 can rotate at a desired rotation angle about the free stop pin 26 of the free stop hinge portion 19 as a rotation shaft.

One longitudinal end of the slide assistance plate 21 is processed to be bent in a U shape, and the other longitudinal end thereof is processed to be bent in a reverse U shape. An end portion of the slide assistance plate 21 illustrated in FIGS. 3 and 4 represents the one end processed to be bent in the U shape.

The slide assistance plate 21 slidably pinch a pair of convex rail members provided along the lateral direction of the upper case 1 using the end portions processed to be bent. Since the convex rail members provided in the upper case 1 are pinched by the end portions processed to be bent in the slide assistance plate 21, the upper case 1 can slide along the lateral direction of the upper case 1.

Also, as described above, the fastening member 18, which is rotatable due to the free stop hinge portion 19, is fixed to the slide assistance plate 21. Accordingly, the upper case 1 can rotate at a desired rotation angle using the free stop hinge portion 19 via the slide assistance plate 21 and the fastening member 18.

As such, the slide rotation mechanism installed in the portable phone is provided with a slide mechanism which includes the rails provided along the sliding direction of the upper case 1 and the slide assistance plate 21 enabling the upper case 1 to slide along the rails of the upper case 1.

In addition, the slide rotation mechanism is provided with a rotation mechanism which is constituted by the base 14, the first arm 15, the second arm 16, the arm connection member 17, the fastening member 18, the free stop hinge portion 19, the click hinge portion 20, and the four rotation support pins 22 to 25, and which rotatably supports the slide assistance plate 21 using the rotation shaft positioned in the extending direction of the slide assistance plate 21.

Slide Rotation Operation

Figure 5A:
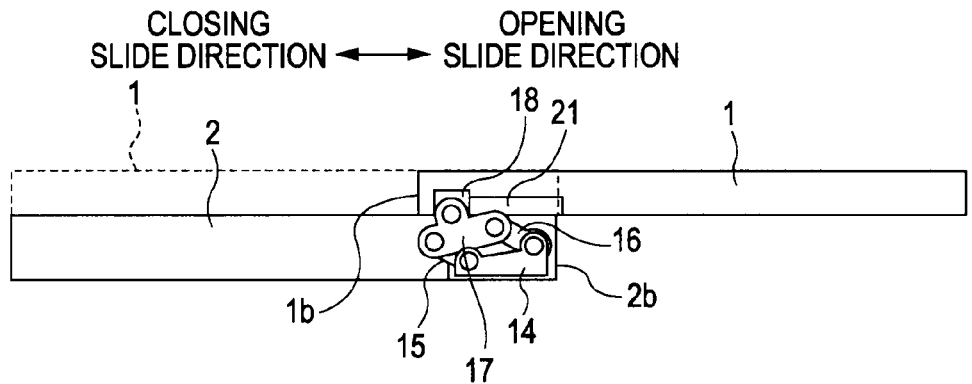
FIGS. 5A to 5C are diagrams illustrating a flow of operations performed by the portable phone according to the first embodiment of the invention, to transit from a closed state to the opened state.
Figure 5B:
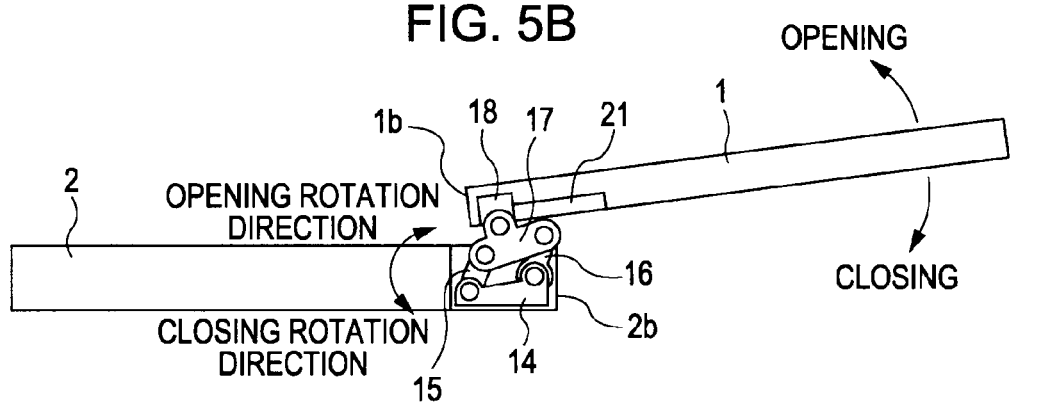
Figure 5C:
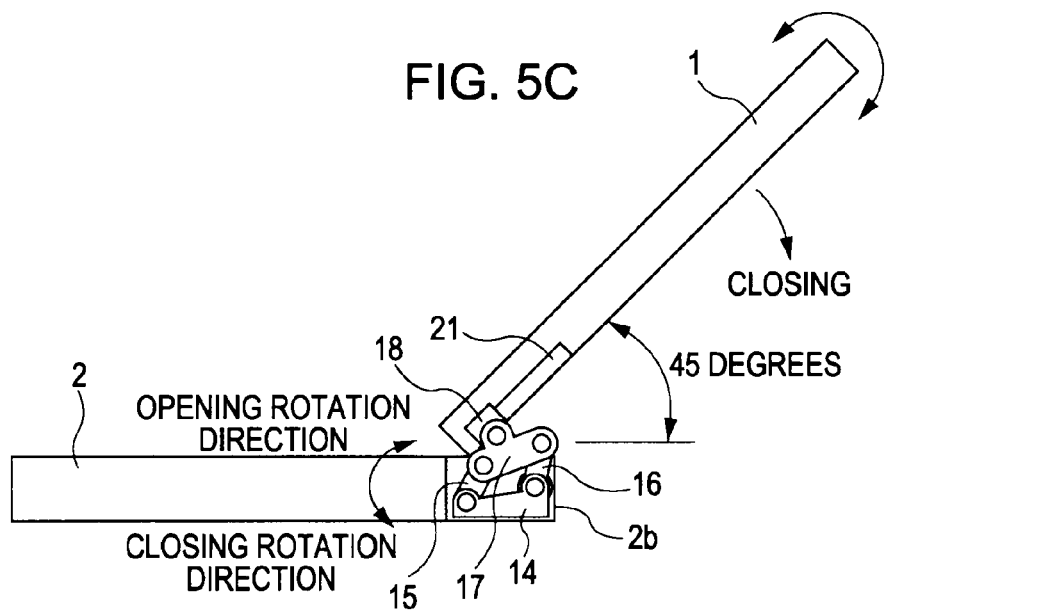

Next, a slide rotation operation of the portable phone according to the first embodiment, having the above-described configuration, will be described. FIGS. 5A to 5C illustrate a flow of slide rotation operations of the portable phone. In the figures, FIG. 5A is a diagram illustrating a state where the upper case 1 is slid in the opening side direction along the lateral direction of the upper case 1 from a state where the upper and lower cases 1 and 2 of the portable phone substantially entirely overlap each other in the closed state. FIG. 5B is a diagram illustrating a state where the upper case 1 rotates in the opening rotation direction after the end portion of the upper case 1 comes in contact with the slide assistance plate 21. FIG. 5C is a diagram illustrating a state where the upper case 1 that rotates in the opening rotation direction stands at a rotation angle of substantially 45 degrees with respect to the lower case 2.

When the portable phone is opened from the closed state, first, as illustrated in FIG. 5A, the upper case 1 is slid in the opening slide direction along the lateral direction from the state where the upper and lower cases 1 and 2 substantially entirely overlap each other (the closed state). When the other end portion 1b of the upper case 1 in the lateral direction is slid to the vicinity of the one end portion 2b of the lower case 2, the other end portion 1b of the upper case 1 comes in contact with the slide assistance plate 21. Then, when a force sliding the upper case 1 in the opening slide direction from this state is continuously exerted, the first and second arms 15 and 16 having the rotation support pins 22 to 25 as rotation shafts rotate in the opening rotation direction as indicated by the arrow illustrated in FIG. 5B.

At this time, as described above, since the other end portions 12b and 13b which support the second arm 16 of the base 14 are formed to be inclined upwardly (the upper case 1 side) and thus the second arm 16 is positioned at upper side (the upper case 1 side) than the first arm 15, the upper case 1 is opened in a state where it stands at an angle substantially equal to the inclined angle.

Next, when the force sliding the upper case 1 in the opening slide direction is continuously exerted on the upper case 1 in the state where the first and second arms 15 and 16 start rotating in the opening rotation direction, as illustrated in FIG. 5C, the rotation operation of the arms 15 and 16 in the opening rotation direction is stopped while the first and second arms 15 and 16 stand. Accordingly, as illustrated in FIG. 5C, the upper case 1 can be obliquely pushed up by the standing arms 15 and 16, so the upper case 1 stands at a predetermined angle (in the example shown in FIG. 5C, about 45 degrees) with respect to the lower case 2, and this allows the portable phone to enter the opened state.

As described above with reference to FIGS. 3 and 4, the fastening member 18, which is rotatable due to the free stop hinge portion 19, is fixed to the slide assistance plate 21. Accordingly, after the upper case 1 stands at the above-described approximately 45 degrees, the upper case 1 can be adjusted to a desired rotation angle using the free stop hinge portion 19 via the slide assistance plate 21 and the fastening member 18, by rotating the upper case 1 in the rotation angle adjustment direction indicated by the arrow in FIG. 5C.

Next, when the portable phone is closed from the opened state, a force in the closing direction indicated by the arrow in FIG. 5C is first exerted on the upper case 1 which stands at the predetermined rotation angle with respect to the lower case 2. Thereby, the first arm 15 and the second arm 16 rotate in the closing rotation direction illustrated in FIG. 5C, and the upper case 1 and the lower case 2 become parallel to each other, as illustrated in FIG. 5A.

When a force in the closing slide direction illustrated in FIG. 5A is exerted on the upper case 1 in this state, the upper case 1 is slid in the closing slide direction via the rails of the upper case 1 and the slide assistance plate 21. As indicated by the dotted lines in FIG. 5A, the upper case 1 and the lower case 2 substantially entirely overlap each other, and the portable phone enters the closed state.

Effects According to the First Embodiment

As can be seen clearly in the above description, in the portable phone according to the first embodiment, the slide mechanism is constituted by the rails which are formed along the sliding direction of the upper case 1 and the slide assistance plate 21 which slides the upper case 1 and is provided in the rails.

The rotation mechanism is constituted by the base 14, the first arm 15, the second arm 16, the arm connection member 17, the fastening member 18, the free stop hinge portion 19, the click hinge portion 20, and the four rotation support pins 22 to 25, and rotatably supports the slide assistance plate 21 using the rotation shaft positioned in the extending direction of the slide assistance plate 21. In addition, the slide mechanism and the rotation mechanism constitute the slide rotation mechanism.

In the opening operation, the upper case 1 is slid in the opening slide operation so that the one end portion 1b of the upper case 1 comes in contact with the slide assistance plate 21. In this state, the first arm 15 and the second arm 16, which rotate in the opening rotation direction due to the force exerted on the upper case 1 in the opening slide direction, allow the slide assistance plate 21 to rotate in the opening rotation direction, and the upper case 1 stands at a predetermined rotation angle with respect to the lower case 2 via the slide assistance plate 21, so the portable phone enters the opened state.

Also, in the closing operation, the first arm 15 and the second arm 16, which rotate in the closing rotation direction due to the force exerted on the upper case 1 in the closing direction as illustrated in FIG. 5C, allow the upper case 1 and the lower case 2 to become parallel to each other. In this state, the upper case 1 is slid in the closing slide direction, and thereby the portable phone enters the closed state where the upper case 1 and the lower case 2 substantially entirely overlap each other.

By using the slide rotation mechanism, it is possible to implement a portable phone which has both functions of a slide-type and a clamshell-type.

In addition, in this embodiment, the slide assistance plate 21 is fixed to the fastening member 18 which is rotatably provided in the free stop hinge portion 19, and thus the slide assistance plate 21 is indirectly fixed to the arm connection member 17 via the fastening member 18 and the free stop hinge portion 19.

However, the slide assistance plate 21 may be directly fixed to the arm connection member 17. In this case, it is difficult to adjust the rotation angle of the upper case 1 to a desired rotation angle after the upper case 1 stands at the rotation angle of 45 degrees or the like described above, but the fastening member 18 and the free stop hinge portion 19 may be omitted. Accordingly, in addition to the above-described effects, it is possible to make the portable phone simpler in the configuration and lighter in weight, and to achieve a low cost, through the decrease in the number of components.

In addition, in this embodiment, although the first arm 15 and the second arm 16 are rotatably supported by the base 14, arm mounting portions may be formed in the lower case 2 side, and the rotation support pins 22 and 23 may be mounted to the arm mounting portions to rotatably support the first arm 15 and the second arm 16 as in the base 14.

In this case, the arm mounting portions provided in the lower case 2 side rotatably support the first arm 15 and the second arm 16 so that the end portion of the second arm 16 through which the rotation support pin 25 is inserted is positioned at higher side than the end portion of the first arm 15 through which the rotation support pin 24 is inserted when the first arm 15 and the second arm 16 rotatably supported by the rotation support pins 22 and 23 respectively stand.

That is to say, the arm mounting portions rotatably support the first arm 15 and the second arm 16 so that the second arm 16 which is an arm near to the one end portion 2b of the lower case 2 is positioned at higher side than the first arm 15 when the first arm 15 and the second arm 16 respectively stand.

Thereby, as in the base 14 provided with the inclination, when the first arm 15 and the second arm 16 stand, the upper case 1 can stand to be inclined with respect to the lower case 2 in the same manner as the above description, by making the second arm 16 positioned at higher side than the first arm 15.

In order to directly install the rotation support pins 22 and 23 in the lower case 2, the base 14 may be omitted. Accordingly, it is possible to make the portable phone simpler in the further configuration and lighter-weight, and to achieve a low cost.

Second Embodiment

A portable phone according to a second embodiment of the invention will now be described.

In the above-described first embodiment, each of the support portions 12 and 13 of the base 14 is inclined so that the end portion of the second arm 16 through which the rotation support pin 25 is inserted is positioned at higher side than the end portion of the first arm 15 through which the rotation support pin 24 is inserted. Thereby, when the end portion of the upper case 1 comes in contact with the slide assistance plate 21 and thereafter rotates in the opening rotation direction, the upper case 1 is opened in the state of standing at an angle substantially equal to the inclined angle.

In recent years, for improving portability, the cases of portable phones have been thinned. The portable phone according to the second embodiment is further thinned by removing the inclinations from the support portions 12 and 13.

Figure 6:
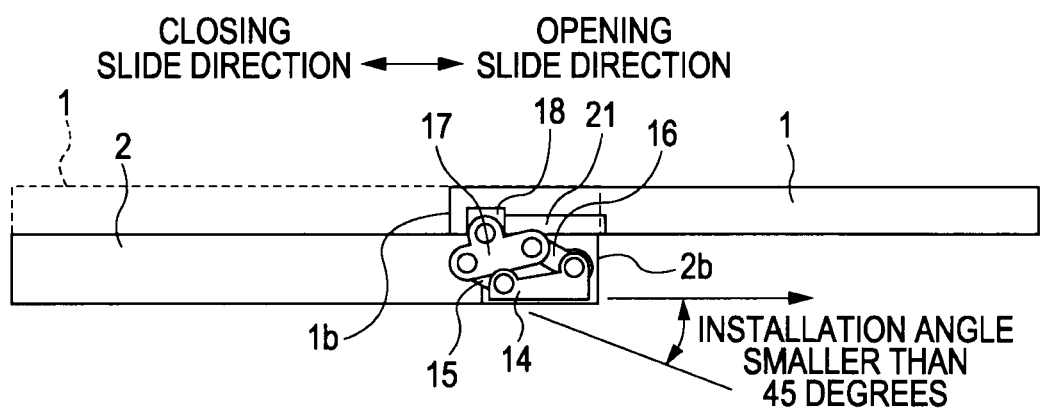
FIG. 6 is a diagram for explaining main points of a portable phone according to a second embodiment of the invention.

Here, when the case is thinned, it is necessary for the first arm 15 and the second arm 16 to be provided in the thinned case. Therefore, as illustrated in FIG. 6, in the closed state, installation angles of the arms 15 and 16 are equal to or less than 45 degrees.

The installation angle of "45 degrees" in the closed state of the arms 15 and 16 is the minimum angle for smoothly transiting the upper case 1 from the sliding to the rotating. Therefore, if the installation angles of the arms 15 and 16 in the closed state are smaller than 45 degrees due to the thinned case, when the other end portion 1b of the upper case 1 comes in contact with the slide assistance plate 21, the other end portion 1b resists against the force in the sliding direction of the upper case 1 on the arms 15 and 16 as spurs. Accordingly, when the installation angles of the arms 15 and 16 in the closed state are smaller than 45 degrees, there is a problem in that it is difficult to smoothly transit the upper case 1 from the sliding to the rotating.

In the meantime, when the installation angles of the arms 15 and 16 are set to be equal to or greater than 45 degrees in the closed state by increasing the thickness of the case, the problem does not occur. However, as the thickness of the case is increased, portability of the portable phone is degraded.

The portable phone according to the second embodiment is a portable phone which is thinned by removing the inclinations from the support portions 12 and 13 as described above, and further which enables smooth transition of the upper case 1 from sliding to rotating even when the installation angles of the arms 15 and 16 in the closed state are smaller than 45 degrees.

Slide Rotation Mechanism

Figure 7:
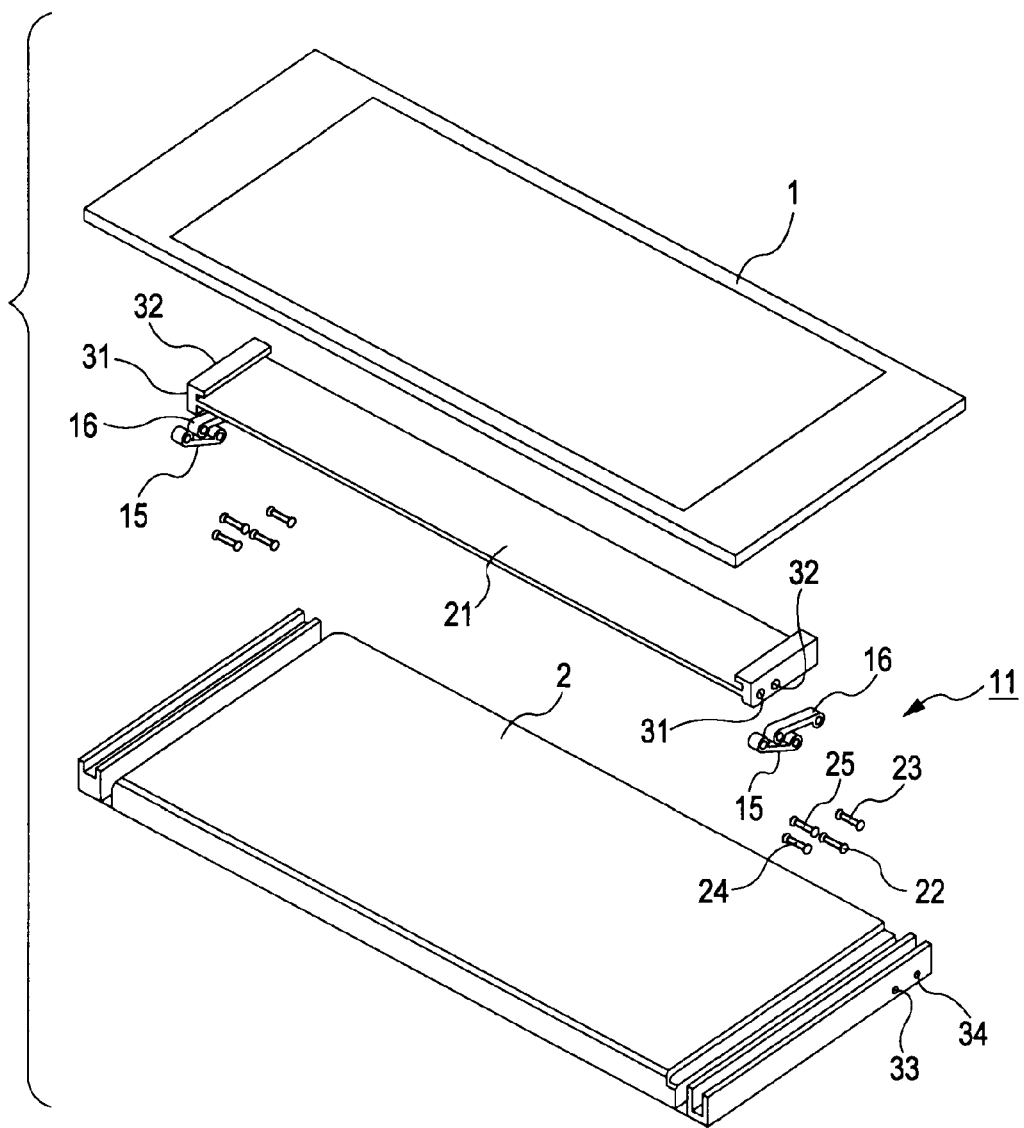
FIG. 7 is an exploded perspective view of the portable phone according to the second embodiment of the invention.
Figure 8:
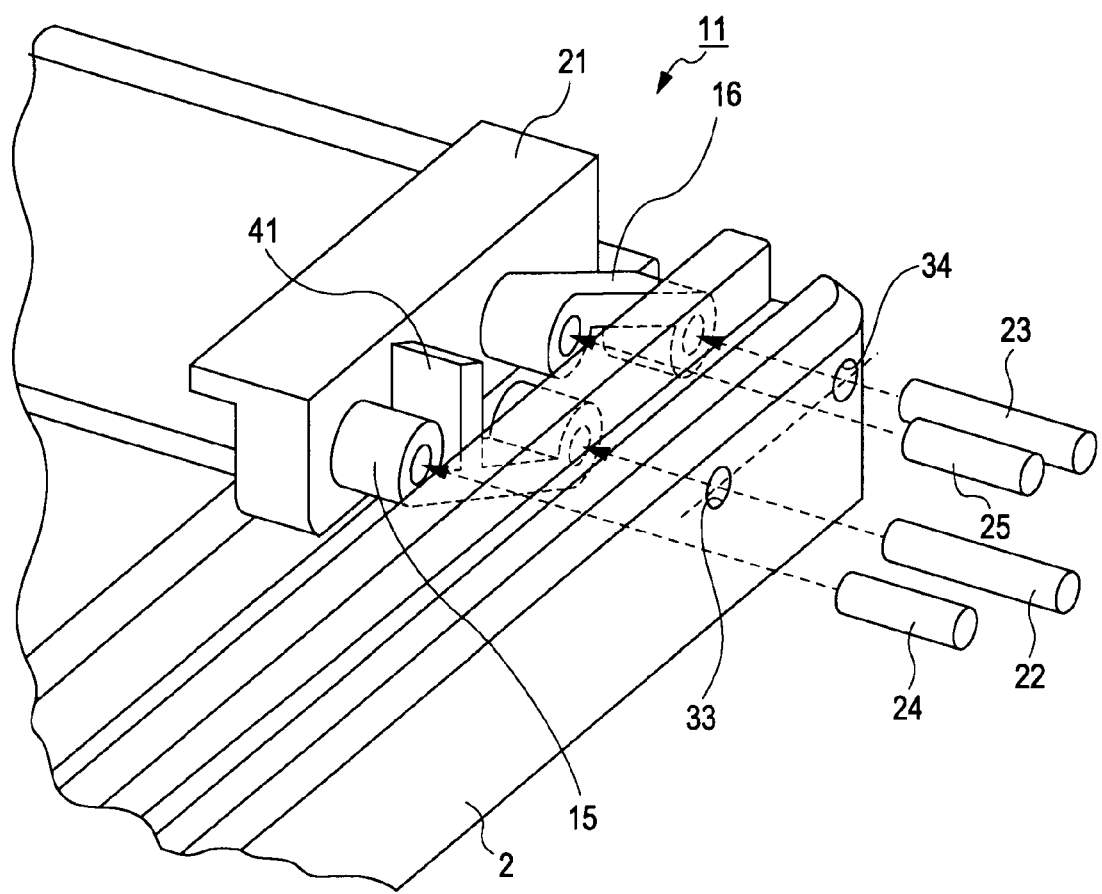
FIG. 8 is an enlarged perspective view of a slide rotation mechanism provided in the portable phone according to the second embodiment of the invention.
Figure 9A:
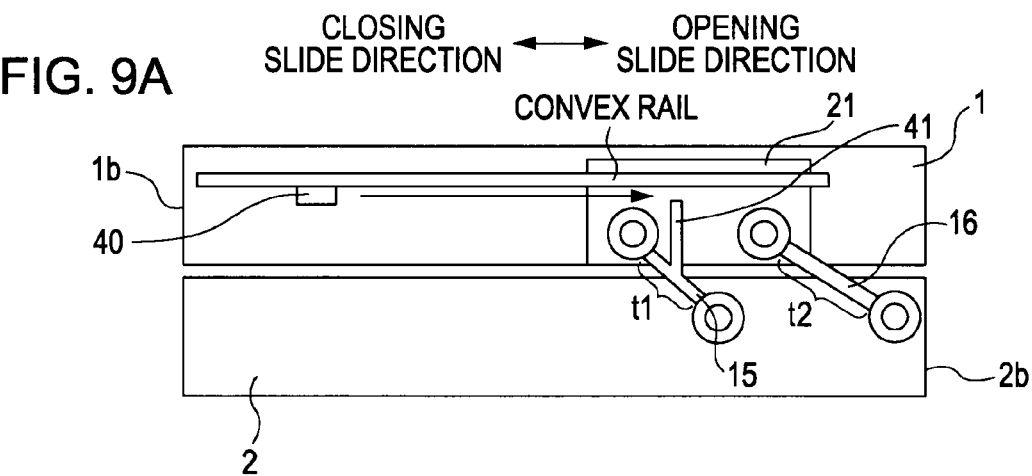
FIGS. 9A to 9C are diagrams for explaining a rotation assistance operation of the portable phone according to the second embodiment of the invention.
Figure 9B:
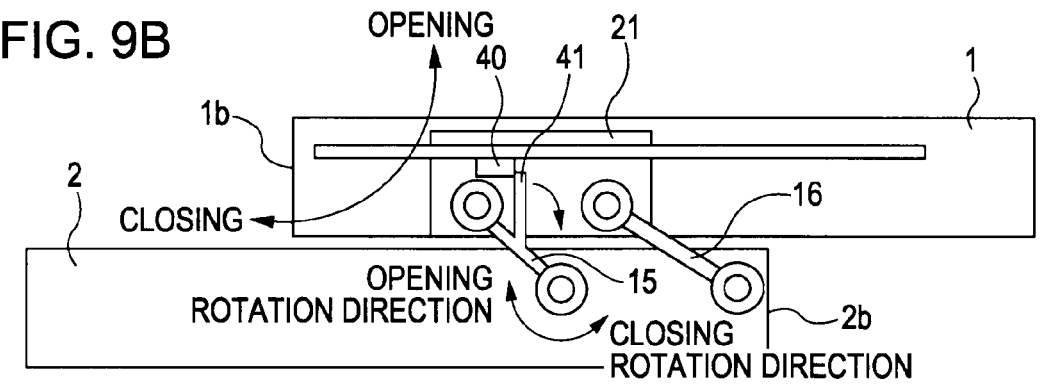
Figure 9C:
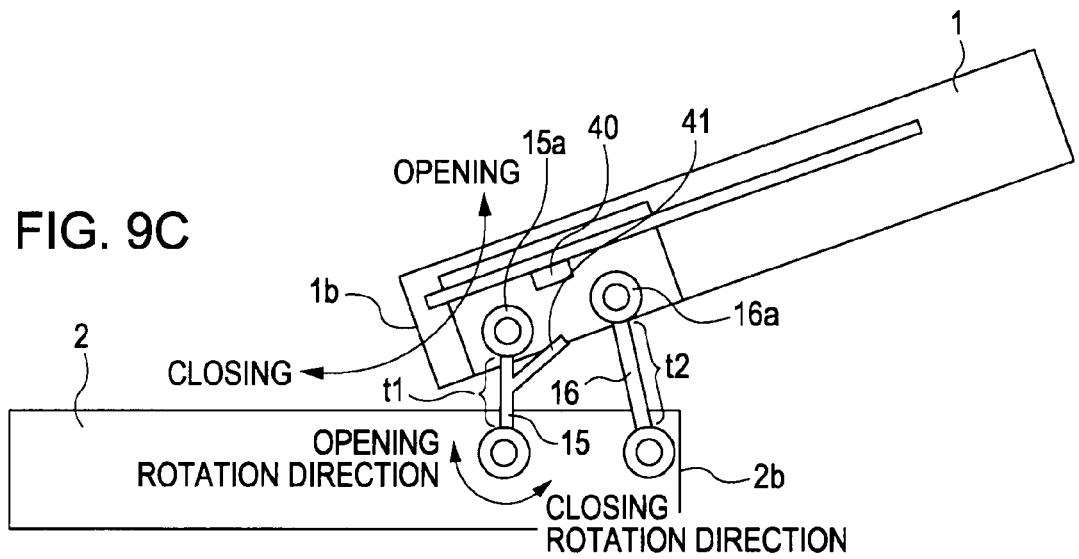

First, FIG. 7 is an exploded perspective view of a main part of a portable phone according to a second embodiment of the invention. FIG. 8 is an enlarged perspective view of the slide rotation mechanism 11 provided in the portable phone according to the second embodiment of the invention. FIGS. 9A to 9C are diagrams illustrating the portable phone according to the second embodiment which is provided with the rotation assistance member by viewing through the lateral side surface thereof. In the figures, FIG. 9A is a diagram illustrating the closed state where the upper and lower cases 1 and 2 of the portable phone substantially overlap each other. FIG. 9B is a diagram illustrating a state where the upper case 1 is slid in the opening direction along the lateral direction of the upper case 1 from the closed state. FIG. 9C is a diagram illustrating a state where the rotating upper case 1 stands at a rotation angle of substantially 45 degrees with respect to the lower case 2.

The portable phone according to the second embodiment has the slide rotation mechanism 11 having a simpler configuration than the portable phone according to the first embodiment.

Specifically, as illustrated in FIGS. 7 and 8, the slide rotation mechanism 11 installed in the portable phone according to the second embodiment includes the first arm 15, the second arm 16, the slide assistance plate 21, and the four rotation support pins 22 to 25 as basic configuration members.

The portion of the slide assistance plate 21 processed to be bent in the U shape, and the portion thereof processed to be bent in the reverse U shape are each provided with a fitting recessed portion 31 for allowing the first arm 15 to be rotatably mounted to the slide assistance plate 21 and a fitting recessed portion 32 for allowing the second arm 16 to be rotatably mounted to the slide assistance plate 21.

The other end portion of the first arm 15 is rotatably supported by the rotation support pin 24 which is fitted to the fitting recessed portion 31 of the slide assistance plate 21. The other end portion of the second arm 16 is rotatably supported by the rotation support pin 25 which is fitted to the fitting recessed portion 32 of the slide assistance plate 21.

In the slide rotation mechanism 11 installed in the portable phone according to the second embodiment, as clearly illustrated in FIGS. 9A and 9C, the length of the first arm 15 (a distance between a rotation shaft of the one end portion supported by the rotation support pin 22 and a rotation shaft of the other end portion supported by the rotation support pin 24) is "t1," whereas the length of the second arm 16 (a distance between a rotation shaft of the one end portion supported by the rotation support pin 23 and a rotation shaft of the other end portion supported by the rotation support pin 25) is "t2" which is greater than the length t1 of the first arm 15 by a predetermined length.

The slide rotation mechanism 11 of the portable phone according to the second embodiment is a slide rotation mechanism in which the base 14 is omitted and the arms 15 and 16 are directly installed in the lower case 2.

That is to say, in the slide rotation mechanism 11 of the portable phone according to the second embodiment, the one end portions of the arms 15 and 16 are provided in the lower case 2 such that an installation position of the one end portion of the first arm 15 through which the rotation support pin 22 is inserted and an installation position of the one end portion of the second arm 16 through which the rotation support pin 23 is inserted lie in a straight line along the lateral direction of the lower case 2.

Thereby, as illustrated in FIG. 8, a lateral side surface of the lower case 2 corresponding to the installation position of the one end portion of the first arm 15 and a lateral side surface of the lower case 2 corresponding to the installation position of the one end portion of the second arm 16 are respectively provided with a hole 33 through which the rotation support pin 22 is inserted and a hole 34 through which the rotation support pin 23 is inserted.

The one end portion of the first arm 15 is inserted by the rotation support pin 22 inserted through the hole 33 and thus the first arm 15 is rotatably provided in the lower case 2. The one end portion of the second arm 16 is inserted by the rotation support pin 23 inserted through the hole 34 and thus the second arm 16 is rotatably provided in the lower case 2.

That is to say, the slide rotation mechanism 11 of the portable phone according to the second embodiment has a configuration in which the inclinations provided in the base 14, which has been described with reference to FIGS. 3 and 4, are removed by positioning the one end portions of the arms 15 and 16 in a straight line along the lateral direction of the lower case 2.

Although the base 14 is omitted by directly installing the first and second arms 15 and 16 in the lower case 2 in this embodiment, the base 14 may be installed in the lower case 2, and the arms 15 and 16 may be rotatably provided in the base 14.

In this case, in the base 14, the one end portion 12a and the other end portion 12b of the support portion 12 described above with reference to FIGS. 3 and 4 have the same height, and the one end portion 13a and the other end portion 13b of the support portion 13 have the same height as the one end portion 12a and the other end portion 12b of the support portion 12. In addition, the pin insertion holes 12c and 12d of the support portion 12 and the fitting recessed portions 13c and 13d of the support portion 13 respectively have the same height, thereby removing the above-described inclinations from the support portions 12 and 13.

The pin insertion hole 12c of the support portion 12 of the base 14 and the one end portion of the first arm 15 are inserted by the rotation support pin 22 inserted through the hole 33 which is installed in the lateral side surface of the lower case 2, and the rotation support pin 22 is fitted to the fitting recessed portion 13c of the support portion 13 of the base 14, thereby rotatably providing the first arm 15 in the base 14 installed in the lower case 2.

In addition, the pin insertion hole 13c of the support portion 13 of the base 14 and the one end portion of the second arm 16 are inserted by the rotation support pin 23 inserted through the hole 34 which is installed in the lateral side surface of the lower case 2, and the rotation support pin 23 is fitted to the fitting recessed portion 13d of the support portion 13 of the base 14, thereby rotatably providing the second arm 16 in the base 14 installed in the lower case 2.

Thereby, as described below, the same effect can be achieved as the case where the first and second arms 15 and 16 are directly installed in the lower case 2.

Slide Rotation Operation

In the portable phone according to the second embodiment having the slide rotation mechanism 11, as described above with reference to FIGS. 5A to 5C, when the upper case 1 is slid in the opening slide direction from the closed state, the end portion of the upper case 1 comes in contact with the slide assistance plate 21. In this state, when a force sliding the upper case 1 in the opening slide direction is continuously exerted on the upper case 1, the first and second arms 15 and 16 rotate in the opening rotation direction, having the rotation support pins 22 to 25 as the rotation shafts and stand.

Here, in the slide rotation mechanism 11 installed in the portable phone according to the second embodiment, since the inclinations formed in the base 14 is removed, for example, if the first arm 15 and the second arm 16 are formed to have the same length, even though a force sliding the upper case 1 in the opening slide direction is continuously exerted on the upper case 1 in the state where the one end portion 1b of the upper case 1 comes in contact with the slide assistance plate 21, the upper case 1 just rotates roughly in parallel to the lower case 2.

However, in the slide rotation mechanism 11 provided in the portable phone according to the second embodiment, as described above, the length t2 of the second arm 16 is greater than the length t1 of the first arm 15 by a predetermined length.

Accordingly, when a force sliding the upper case 1 in the opening slide direction is continuously exerted on the upper case 1 in the state where the one end portion 1b of the upper case 1 comes in contact with the slide assistance plate 21, a radius of rotation traced by the second arm 16 is longer than a radius of rotation traced by the first arm 15 by the predetermined length, and, for example, as illustrated in FIG. 9C, the other end portion 16a of the second arm 16 is positioned at upper side than the other end portion 15a of the first arm 15.

As a result, the other end portion 16a of the second arm 16 is positioned at higher side than the other end portion 15a of the first arm 15. Thereby, the upper case 1 stands at a rotation angle of, for example, substantially 45 degrees with respect to the lower case 2.

In the meantime, the slide rotation mechanism 11 of the portable phone according to the second embodiment includes a rotation assistance member for assisting a rotation standing operation of each of the arms 15 and 16 as well as the first arm 15, the second arm 16, the slide assistance plate 21, and the four rotation support pins 22 to 25 which are the above-described basic configuration members.

As can be seen in FIG. 8 and FIGS. 9A to 9C, the rotation assistance member has a projecting block 40 and a contact projecting portion 41. The contact projecting portion 41 is fixed to the first arm 15 to project toward the upper case 1. In addition, the projecting block 40 is provided in the vicinity of the other end portion 1b of the upper case 1 so that the projecting block 40 comes in contact with the contact projecting portion 41 provided to the first arm 15 when the upper case 1 is slid in the opening slide direction to open the portable phone.

When the portable phone is opened from the closed state illustrated in FIG. 9A, the upper case 1 is slid in the opening slide direction indicated by the arrow in FIG. 9A. When the other end portion 1b of the upper case 1 is slid to the vicinity of the one end portion 2b of the lower case 2, the projecting block 40 provided in the upper case 1 comes in contact with the contact projecting portion 41 provided to the first arm 15. In this state, when a force sliding the upper case 1 in the opening slide direction is applied to the upper case 1, a force pressing the contact projecting portion 41 from the projecting block 40 is exerted on the first arm 15. Therefore, the first arm 15 starts rotating in the opening rotation direction indicated by the arrow in FIG. 9B, and the second arm 16 starts rotating in the opening rotation direction as the first arm 15 rotates in the opening rotation direction.

Next, when a force sliding the upper case 1 in the opening slide direction is continuously exerted on the upper case 1 in the state where the first and second arms 15 and 16 start rotating in the opening rotation direction, the second arm 16 comes in contact with a stopper provided in the lower case 2 side, and, as illustrated in FIG. 9C, the rotating of the arms 15 and 16 in the opening rotation direction is stopped in the state where the first and second arms 15 and 16 stand. Accordingly, as illustrated in FIG. 9C, the upper case 1 stands at a rotation angle of substantially 45 degrees with respect to the lower case 2.

In addition, although the second arm 16 comes in contact with the stopper provided in the lower case 2 side and thus the rotating of the arms 15 and 16 in the opening rotation direction is stopped in this embodiment, it is also possible that a stopper which comes in contact with the first arm 15 is provided, the first arm 15 comes in contact with the stopper, and thereby the rotating of the arms 15 and 16 in the opening rotation direction is stopped. Further, it is also possible that a stopper which comes in contact with each of the first and second arms 15 and 16 is provided, and the rotating of the arms 15 and 16 in the opening rotation direction is stopped when each of the arms 15 and 16 comes in contact with the stopper.

As described above, in the portable phone according to the second embodiment, since the slide rotation mechanism 11 includes the rotation assistance member having the projecting block 40 and the contact projecting portion 41, the first arm 15

(and the second arm 16) easily rotates in the opening rotation direction using the rotation assistance member. Accordingly, along with the effect achieved by the portable phone according to the first embodiment, even though the installation angles of the first and second arms 15 and 16 in the closed state of the portable phone are smaller than 45 degrees, it is possible to smoothly transit the upper case 1 from sliding in the opening slide direction to rotating in the opening rotation direction.

In addition, since the upper case 1 can be smoothly transited from sliding in the opening slide direction to rotating in the opening rotation direction by the rotation assistance member, the installation angles of the first and second arms 15 and 16 in the closed state of the portable phone can be set to be smaller than 45 degrees. Accordingly, thinning of the case of the portable phone can be implemented. That is to say, although the case is thinned, it is possible to provide a portable phone which allows the upper case 1 to smoothly slide in the opening slide direction and smoothly rotate in the opening rotation direction.

Third Embodiment

Figure 10A:
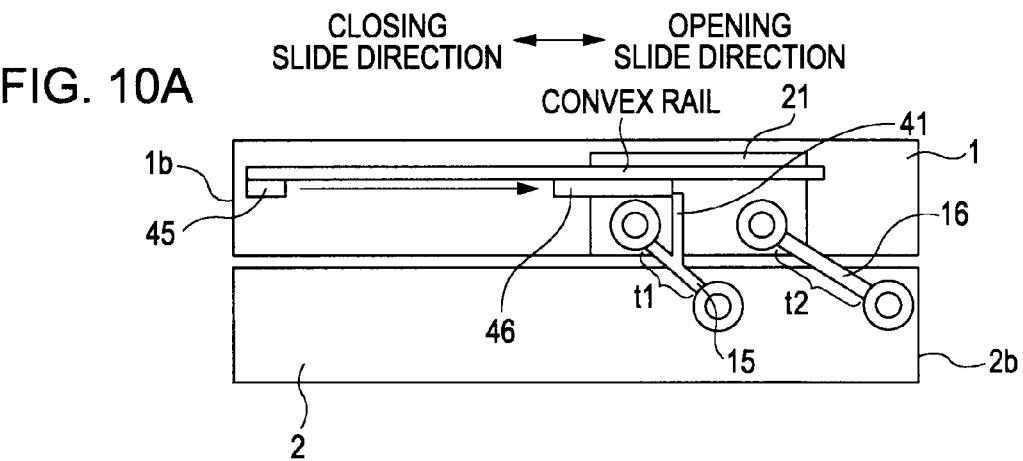
FIGS. 10A to 10C are diagrams for explaining a rotation assistance operation of a portable phone according to a third embodiment of the invention.
Figure 10B:
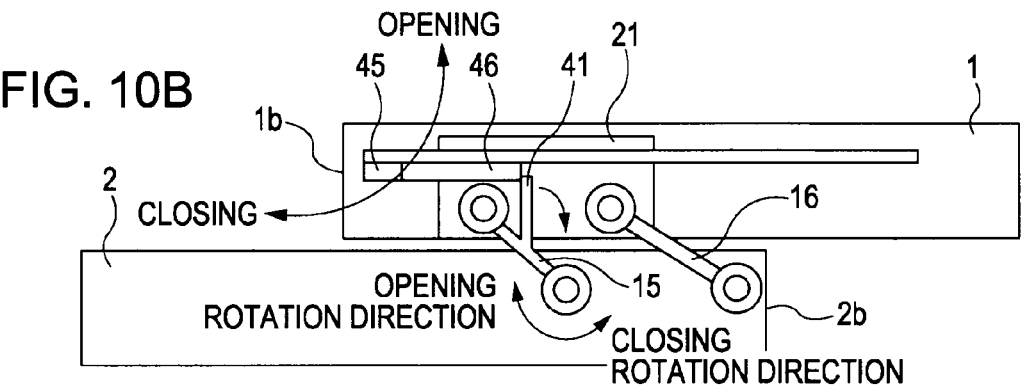
Figure 10C:
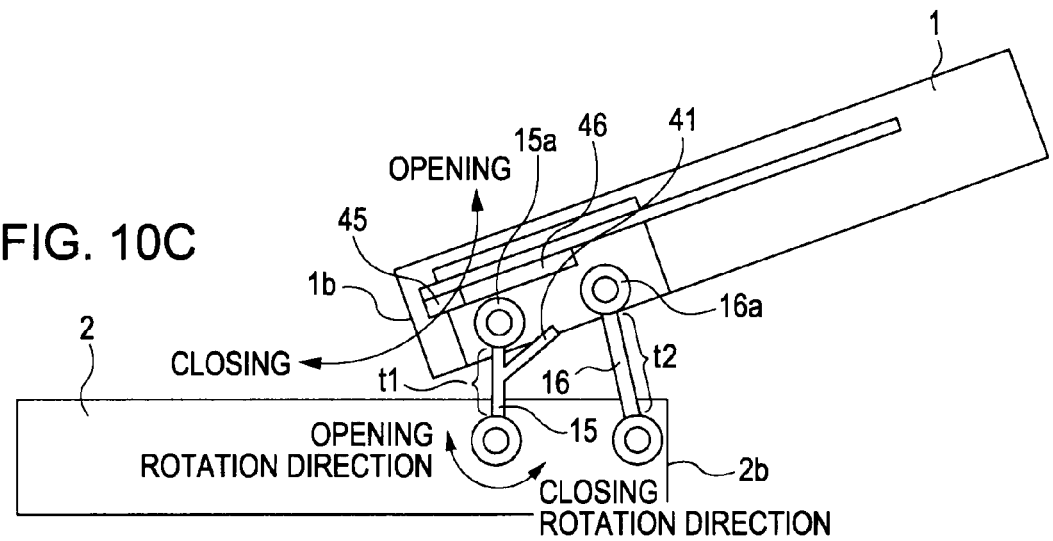

Next, a portable phone according to a third embodiment of the invention will be described. The portable phone according to the third embodiment includes a rotation assistance member provided in the slide rotation mechanism 11 as illustrated in FIGS. 10A to 10C. In the figures, FIG. 10A is a diagram illustrating a closed state where the upper and lower cases 1 and 2 of the portable phone substantially overlap each other. FIG. 10B is a diagram illustrating a state where the upper case 1 is slid in the opening slide direction along the lateral direction of the upper case 1 from the closed state. FIG. 10O is a diagram illustrating a state where the rotating upper case 1 stands at a rotation angle of substantially 45 degrees with respect to the lower case 2.

As can be seen in FIGS. 10A to 10C, the portable phone according to the third embodiment has a projecting block 45, a kick member 46, and the contact projecting portion 41 as the rotation assistance member.

The projecting block 45 is provided to be fixed to the vicinity of the other end portion 1b of the upper case 1.

The kick member 46 is provided on a sliding path of the projecting block 45 at the time of the opening operation of the portable phone. The kick member 46 is provided to be biased to the closing slide direction by a spring member such as, for example, a spring, a plate spring or the like, such that the position immediately before the kick member 46 comes in contact with the contact projecting portion 41 is an initial position in the closed state of the portable phone illustrated in FIG. 10A. Also, when pressed in the opening slide direction via the projecting block 45, the kick member 46 acts against the biasing force of the spring member and slides in the opening slide direction to a predetermined extent.

The contact projecting portion 41 projects towards the upper case 1 and is fixed to the first arm 15 so as to come in contact with the kick member 46 when the kick member 46 slides in the opening slide direction.

When the portable phone enters the opened state illustrated in FIG. 10C from the closed state illustrated in FIG. 10A, the upper case 1 is slid in the opening slide direction as indicated by the arrow in FIG. 10A. When the other end portion 1b of the upper case 1 is slid to the vicinity of the one end portion 2b of the lower case 2, the projecting block 45 provided in the upper case 1 comes in contact with the kick member 46. In this state, when a force sliding the upper case 1 in the opening slide direction is exerted on the upper case 1, the projecting block 45 acts against the biasing force in the closing slide direction by the spring member and slides the kick member 46 in the opening slide direction. Thereby, the kick member 46 comes in contact with the contact projecting portion 41 provided to the first arm 15.

In this state, when a force sliding the upper case 1 in the opening slide direction is exerted on the upper case 1, a force pressing the contact projecting portion 41 via the projecting block 45 and the kick member 46 is exerted on the first arm 15. Therefore, the first arm 15 starts rotating in the opening rotation direction indicated by the arrow in FIG. 10B, and the second arm 16 starts rotating in the opening rotation direction when the first arm 15 rotates in the opening rotation direction.

Next, when a force sliding the upper case 1 in the opening slide direction is continuously exerted on the upper case 1 in the state where the first and second arms 15 and 16 start rotating in the opening rotation direction, the second arm 16 comes in contact with the stopper provided in the lower case 2 side, and, as illustrated in FIG. 10C, the rotating of the arms 15 and 16 in the opening rotation direction is stopped in the state where the first and second arms 15 and 16 stand. Accordingly, as illustrated in FIG. 10C, the upper case 1 stands at a rotation angle of substantially 45 degrees with respect to the lower case 2.

In addition, when the portable phone enters the closed state illustrated in FIG. 10A from the opened state illustrated in FIG. 10C, the cases 1 and 2 become parallel to each other by rotating the upper case 1, which stands with respect to the lower case 2, in the closing rotation direction. The upper case 1 is slid in the closing slide direction from the parallel state. Thereby, the arms 15 and 16 rotate in the closing rotation direction, and the upper case 1 is slid in the closing slide direction, so the portable phone lies in the closed state illustrated in FIG. 10A.

As described above, in the portable phone according to the third embodiment, since the slide rotation mechanism 11 includes the rotation assistance member having the projecting block 45, the kick member 46, and the contact projecting portion 41, the first arm 15 (and the second arm 16) easily rotate in the opening rotation direction using the rotation assistance member. Accordingly, even though the installation angles of the first and second arms 15 and 16 in the closed state of the portable phone are smaller than 45 degrees, it is possible to smoothly transit the upper case 1 from sliding in the opening slide direction to rotating in the opening rotation direction.

In addition, since the upper case 1 can be smoothly transited from sliding in the opening slide direction to rotating in the opening rotation direction by the rotation assistance member, the installation angles of the first and second arms 15 and 16 in the closed state of the portable phone can be set to be smaller than 45 degrees. Accordingly, thinning of the case of the portable phone can be implemented. That is to say, although the case is thinned, it is possible to provide a portable phone which allows the upper case 1 to smoothly slide in the opening slide direction and smoothly rotate in the opening rotation direction.

In addition, in the case of the third embodiment, although the projecting block 45 does not project toward the lower case 2, the contact projecting portion 41 can be pressed by the projecting block 45 via the kick member 46. Accordingly, the projecting block 45 does not project toward the lower case 2. Therefore, as the upper case 1 slide, a problem in which the projecting block 45 rubs against while sliding over the lower case 2 can be prevented.

Fourth Embodiment

Figure 11A:
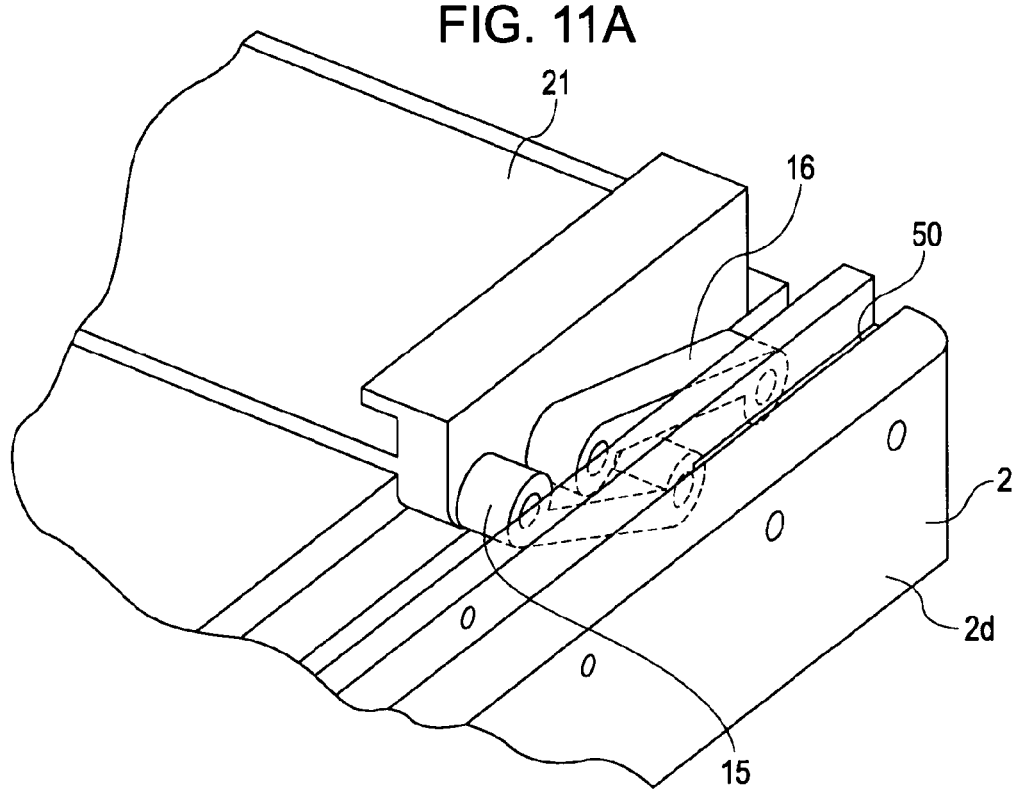
FIGS. 11A and 11B are perspective views of a main part of a portable phone according to a fourth embodiment of the invention.

Next, a portable phone according to a fourth embodiment of the invention will be described. The portable phone according to the fourth embodiment includes, as illustrated in FIGS. 11A and 11B, a groove 50 provided along the lateral direction of the lower case 2 between a lateral side surface 2d of the lower case 2 and the installation positions of the arms 15 and 16.

In addition, the portable phone according to the fourth embodiment includes, as illustrated in FIG. 12, a projecting block 53 which is provided in the vicinity of the other end portion 1b of the upper case 1 to project toward the lower case 2 and to be movable along the groove 50 formed in the lower case 2.

Figure 11B:
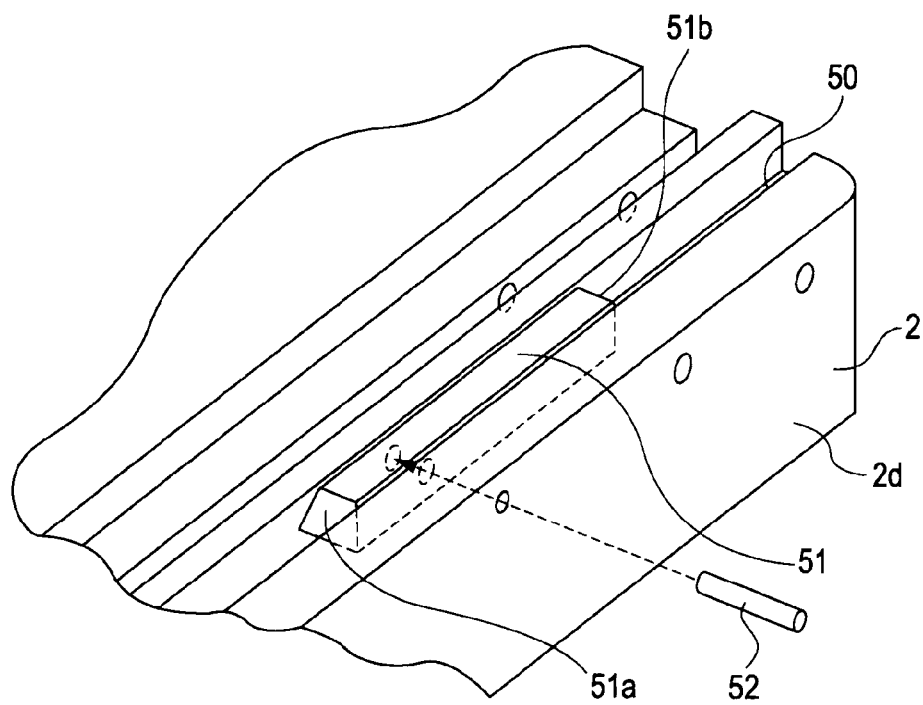

The groove 50 is provided with a rotation kick member 51 as illustrated in FIG. 11B. The rotation kick member 51 is rotatably supported by a rotation support pin 52 inserted from the side surface 2d of the lower case 2 along the longitudinal direction of the lower case 2. In addition, a contact portion 51a of the rotation kick member 51 which comes in contact with the projecting block 53 is processed to be inclined so that the rotation kick member 51 rotates in a downward direction of the lower case 2 indicated by the arrow in FIG. 12 when the contact portion 51a comes in contact with the projecting block 53.

As can be seen in the description, the portable phone according to the fourth embodiment includes the rotation kick member 51 and the projecting block 53 as the rotation assistance member of the slide rotation mechanism 11.

When the upper case 1 is slid in the opening slide direction indicated by the arrow in FIG. 12 to open the portable phone from the above-described closed state, the projecting block 53 of the upper case 1 which moves along the groove 50 comes in contact with the contact portion 51a of the rotation kick member 51.

In this state, when a force sliding the upper case 1 in the opening slide direction is exerted on the upper case 1, the projecting block 53 presses down an end portion of the contact portion 51a side of the rotation kick member 51 toward the lower case 2 as indicated by the arrow in FIG. 12. When the end portion of the contact portion 51a side is pressed down toward the lower case 2 by the projecting block 53, the rotation kick member 51 rotates about the rotation support pin 52 as a rotation shaft, and thereby an end portion 51b opposite to the contact portion 51a rotates toward the upper case 1. Accordingly, a force pushing the upper case 1 up is exerted on the upper case 1 via the rotation kick member 51.

When the force pushing the upper case 1 up is exerted on the upper case 1 via the rotation kick member 51, the first arm 15 starts rotating in the opening rotation direction indicated by the arrow in FIG. 12, and the second arm 16 starts rotating in the opening rotation direction when the first arm 15 rotates.

Next, when the force sliding the upper case 1 in the opening slide direction is continuously exerted on the upper case 1 in the state where the first and second arms 15 and 16 start rotating in the opening rotation direction, as described above, the first and second arms 15 and 16 stand, and the upper case 1 stands at a rotation angle of substantially 45 degrees with respect to the lower case 2.

As described above, in the portable phone according to the fourth embodiment, since the slide rotation mechanism 11 includes the rotation assistance member having the projecting block 53 and the rotation kick member 51, the first arm 15 (and the second arm 16) easily rotate in the opening rotation direction using the rotation assistance member. Accordingly, even though the installation angles of the first and second arms 15 and 16 in the closed state of the portable phone are smaller than 45 degrees, it is possible to smoothly transit the upper case 1 from sliding in the opening slide direction to rotating in the opening rotation direction.

In addition, since the upper case 1 can be smoothly transited from sliding in the opening slide direction to rotating in the opening rotation direction by the rotation assistance member, the installation angles of the first and second arms 15 and 16 in the closed state of the portable phone can be set to be smaller than 45 degrees. Accordingly, thinning of the case of the portable phone can be implemented. That is to say, although the case is thinned, it is possible to provide a portable phone which allows the upper case 1 to smoothly slide and smoothly rotate.

Fifth Embodiment

Figure 13:
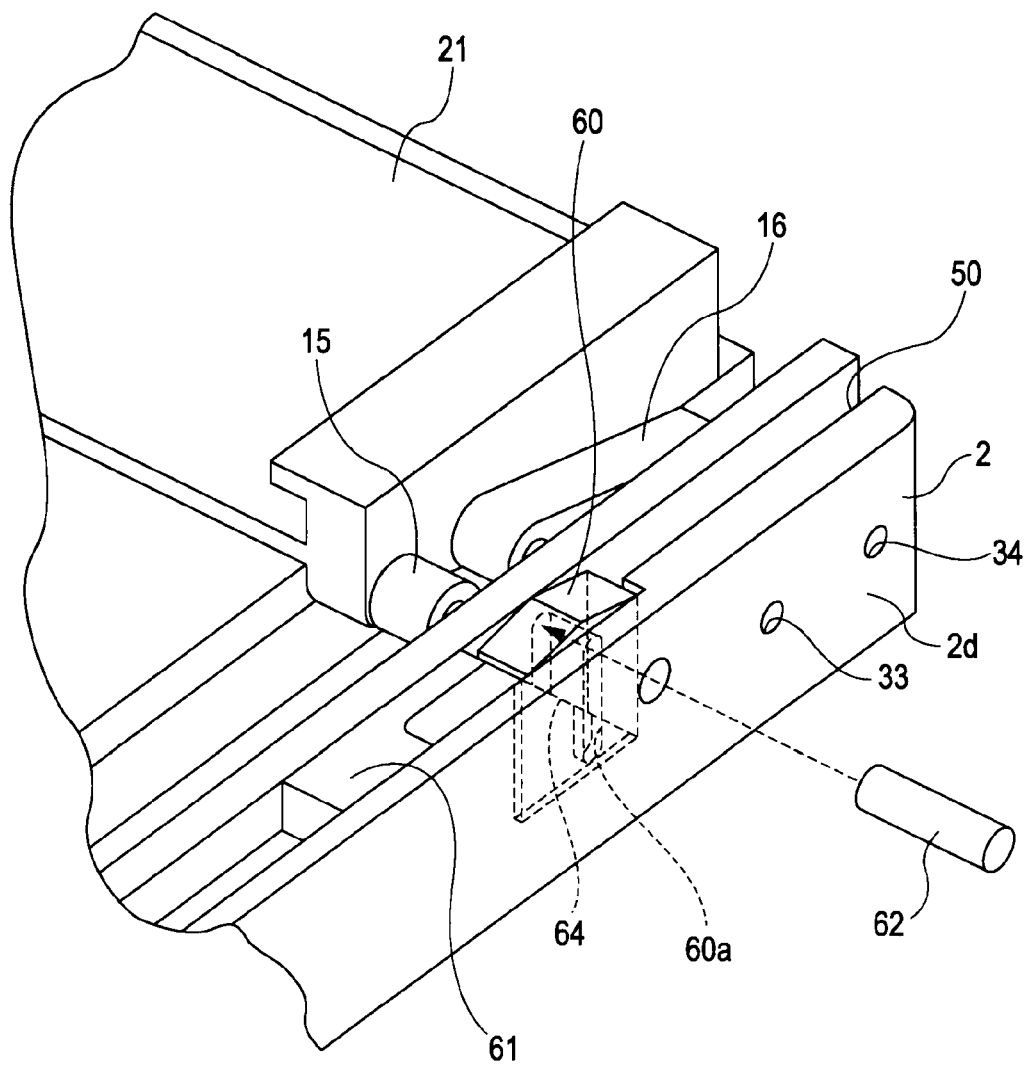
FIG. 13 is a perspective view of a main part of a portable phone according to a fifth embodiment of the invention.

Next, a portable phone according to a fifth embodiment of the invention will be described. The portable phone according to the fifth embodiment includes, as illustrated in FIG. 13, the groove 50 provided along the lateral direction of the lower case 2 between the lateral side surface 2d of the lower case 2 and the installation positions of the arms 15 and 16. The groove 50 is provided with a push-up member 60 and a kick member 61.

The push-up member 60 includes a long hole 60a having a long elliptic shape provided along the thickness direction of the lower case 2. Through the long hole 60a having the long elliptic shape of the push-up member 60, a support pin 62 is inserted along the longitudinal direction of the lower case 2 from the side surface 2d of the lower case 2 so as to support the push-up member 60 by the support pin 62. Accordingly, the push-up member 60 moves upwardly and downwardly in the thickness direction of the lower case 2 along the long hole 60a having the long elliptic shape.

Figure 14A:
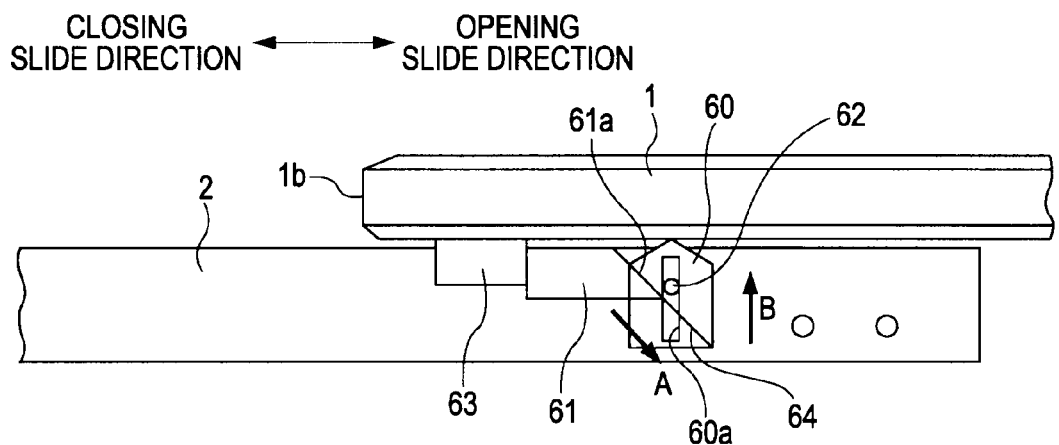
FIGS. 14A and 14B are diagrams for explaining a rotation assistance operation of the portable phone according to the fifth embodiment of the invention.
Figure 14B:
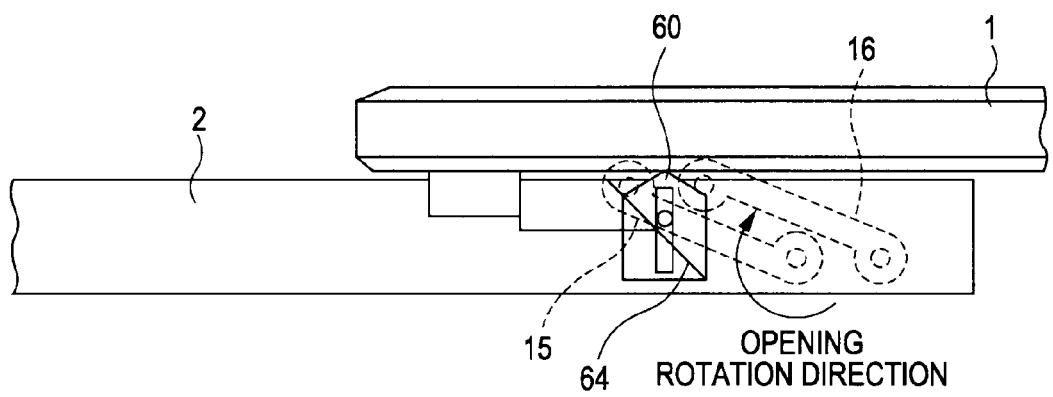

In addition, as illustrated in FIGS. 14A and 14B, the push-up member 60 includes a tapered portion 64 formed by processing a portion of the push-up member 60 which comes in contact with the kick member 61 to be inclined obliquely so that the push-up member 60 is pushed up toward the upper case 1 when pressed by the kick member 61.

The kick member 61 is provided in the groove 50 to move in the opening slide direction to an extent pushed by the push-up member 60. As illustrated in FIG. 14A, a front end portion 61a of the kick member 61 which comes in contact with the tapered portion 64 is processed to be inclined in accordance with the tapered portion 64 processed to be inclined.

In addition, as illustrated in FIG. 14A, the portable phone is provided with a projecting block 63 which is provided in the vicinity of the other end portion 1b of the upper case 1 to project toward the lower case 2 and to press the kick member 60 when moving along the groove 50 formed in the lower case 2.

As can be seen in the description, the portable phone according to the fifth embodiment includes the push-up member 60, the kick member 61, and the projecting block 63 as the rotation assistance member of the slide rotation mechanism 11.

When the upper case 1 is slid in the opening slide direction indicated by the arrow in FIG. 14A to open the portable phone from the above-described closed state, the projecting block 63 of the upper case 1 that moves along the groove 50 comes in contact with the kick member 61. In this state, when a force sliding the upper case 1 in the opening slide direction is exerted on the upper case 1, the kick member 61 slides in the opening slide direction such that the front end portion 61a of the kick member 61 comes in contact with the tapered portion 64 of the push-up member 60.

In this state, when a force sliding the upper case 1 in the opening slide direction is exerted on the upper case 1, the front end portion 61a of the kick member 61 is likely to move following the shape of the tapered portion 64 of the push-up member 60 as indicated by the arrow A in FIG. 14A.

Here, the push-up member 60 is provided in the lower case 2 by inserting the support pin 62 through the long hole 60a having the long elliptic shape provided along the thickness direction of the lower case 2. Accordingly, as indicated by the arrow A in FIG. 14A, the force that attempts to move the front end portion 61a of the kick member 61 following the shape of the tapered portion 64 of the push-up member 60 is converted into a force that moves the push-up member 60 toward the upper case 1 along the long hole 60a as indicated by the arrow B in FIG. 14A. Accordingly, the push-up member 60 moves toward the upper case 1 to push the upper case 1 up.

When the upper case 1 is pushed up by the push-up member 60, the first arm 15 starts rotating in the opening rotation direction indicated by the arrow in FIG. 14B, and the second arm 16 starts rotating in the opening rotation direction when the first arm 15 rotates in the opening rotation direction.

Next, when a force sliding the upper case 1 in the opening slide direction is continuously exerted on the upper case 1 in the state where the first and second arms 15 and 16 start rotating in the opening rotation direction, as described above, the first and second arms 15 and 16 stand, and the upper case 1 stands at a rotation angle of substantially 45 degrees with respect to the lower case 2.

As described above, in the portable phone according to the fifth embodiment, since the slide rotation mechanism 11 includes the rotation assistance member having the push-up member 60, the kick member 61, and the projecting block 63, the first arm 15 (and the second arm 16) easily rotate in the opening rotation direction using the rotation assistance member. Accordingly, even though the installation angles of the first and second arms 15 and 16 in the closed state of the portable phone are smaller than 45 degrees, it is possible to smoothly transit the upper case 1 from sliding in the opening slide direction to rotating in the opening rotation direction.

In addition, since the upper case 1 can be smoothly transited from sliding in the opening slide direction to rotating in the opening rotation direction by the rotation assistance member, the installation angles of the first and second arms 15 and 16 in the closed state of the portable phone can be set to be smaller than 45 degrees. Accordingly, thinning of the case of the portable phone can be implemented. That is to say, although the case is thinned, it is possible to provide a portable phone which allows the upper case 1 to smoothly slide in the opening slide direction and smoothly rotate in the opening rotation direction.

Sixth Embodiment

Figure 15:
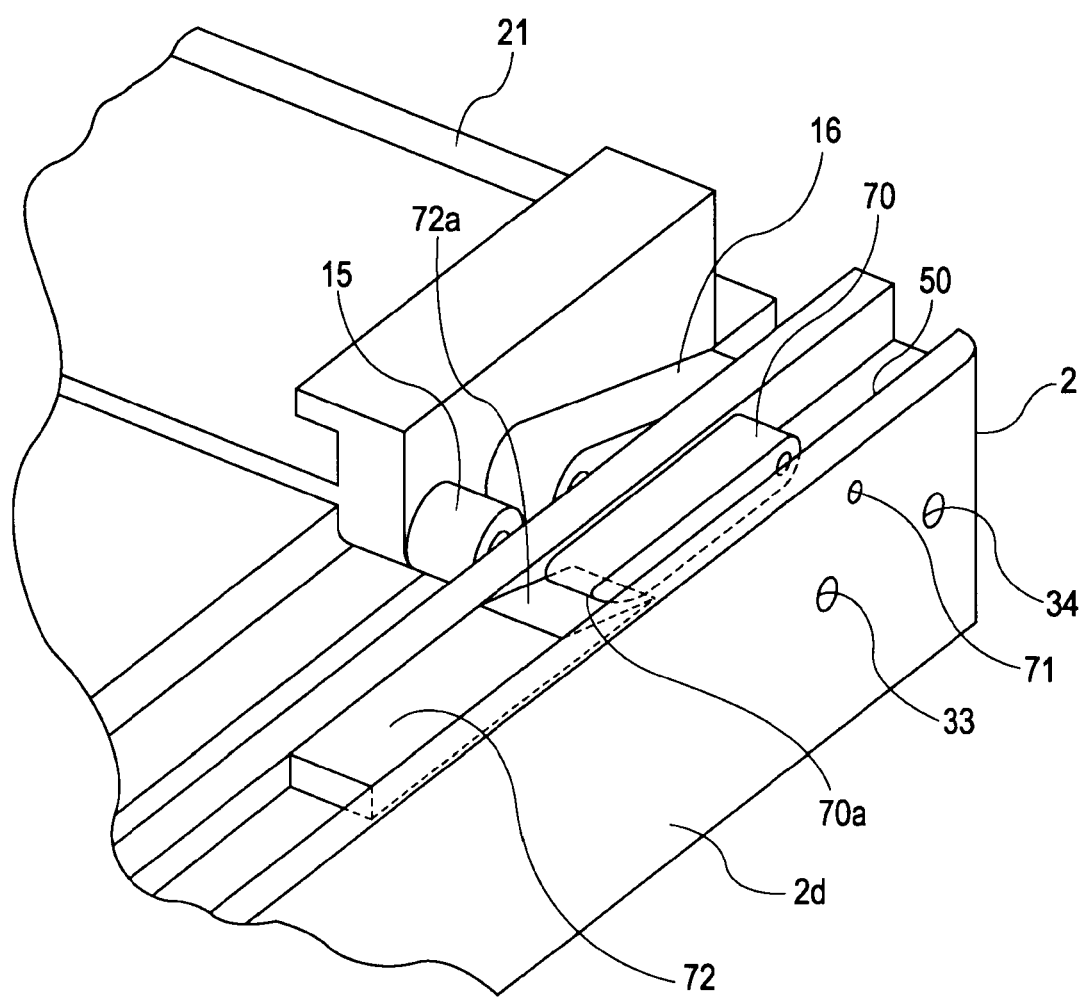
FIG. 15 is a perspective view of a main part of a portable phone according to a sixth embodiment of the invention.

Next, a portable phone according to a sixth embodiment of the invention will be described. The portable phone according to the sixth embodiment includes, as illustrated in FIG. 15, the groove 50 provided along the lateral direction of the lower case 2 between the lateral side surface 2d of the lower case 2 and the installation positions of the arms 15 and 16. The groove 50 is provided with a rotation push-up member 70 and a kick member 72.

The rotation push-up member 70 is rotatably supported by a rotation support pin 71 inserted from the side surface 2d of the lower case 2 along the longitudinal direction of the lower case 2. In addition, as illustrated in FIG. 16A, the front end portion 70a of the rotation push-up member 70 is processed to be inclined obliquely so that the rotation push-up member 70 is rotated and pushed up toward the upper case 1 when pressed by the kick member 72.

The kick member 72 is provided in the groove 50 to move in the slide direction to the extent pushed by the rotation push-up member 70. In addition, as illustrated in FIG. 16A, a front end portion 72a of the kick member 72 which comes in contact with the front end portion 70a of the rotation push-up member 70 is processed to be inclined in accordance with the front end portion 70a of the rotation push-up member 70 processed to be inclined.

Figure 16A:
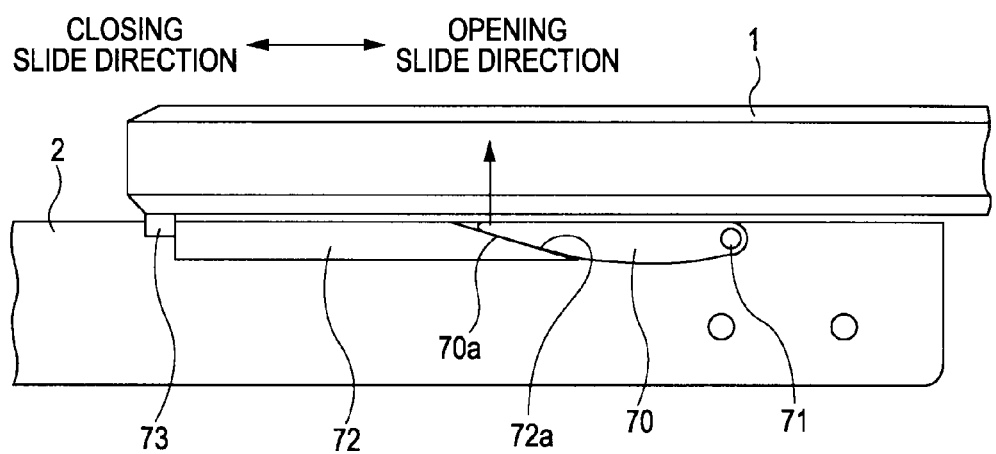
FIGS. 16A and 16B are diagrams for explaining a rotation assistance operation of the portable phone according to the sixth embodiment of the invention.

In addition, the portable phone includes, as illustrated in FIG. 16A, a projecting block 73 which is provided in the vicinity of the other end portion 1b of the upper case 1 to project toward the lower case 2 and to press the kick member 72 when moving along the groove 50 formed in the lower case 2.

As can be seen in the description, the portable phone according to the sixth embodiment includes the rotation push-up member 70, the kick member 72, and the projecting block 73 as the rotation assistance member of the slide rotation mechanism 11.

When the upper case 1 is slid in the opening slide direction indicated by the arrow in FIG. 16A to open the portable phone from the above-described closed state, the projecting block 73 of the upper case 1 that moves along the groove 50 comes in contact with the kick member 72. In this state, when a force sliding the upper case 1 in the opening slide direction is exerted on the upper case 1, the kick member 72 slides in the opening slide direction such that the front end portion 72a of the kick member 72 comes in contact with the front end portion 70a of the rotation push-up member 70.

In this state, when a force sliding the upper case 1 in the opening slide direction is exerted on the upper case 1, the front end portion 72a of the kick member 72 is likely to move along the shape of the front end portion 70a of the rotation push-up member 70 (that is, the front end portion 72a of the kick member 72 crawls under the rotation push-up member 70). Accordingly, the rotation push-up member 70 rotates about the rotation support pin 71 as a rotation shaft to push up the upper case 1 as indicated by the arrow in FIG. 16A.

Figure 16B:
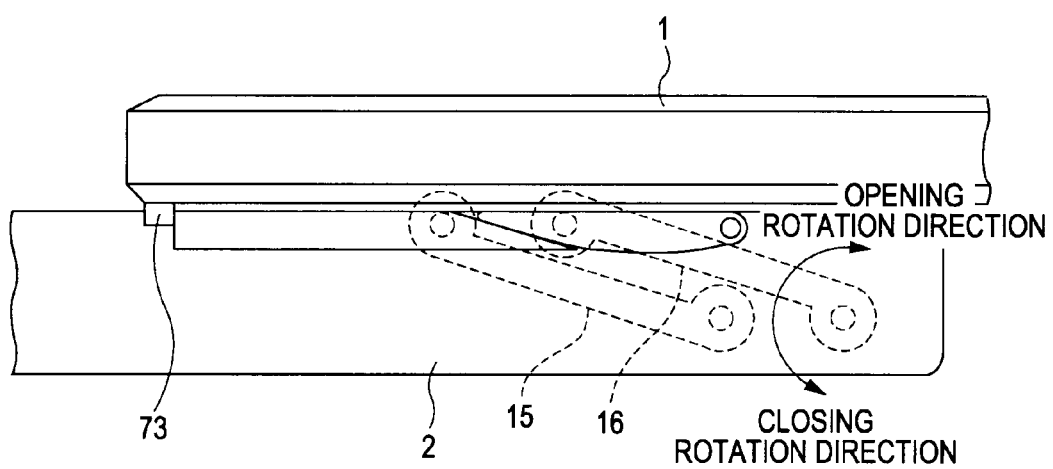

When the upper case 1 is pushed up by the rotation push-up member 70, the first arm 15 starts rotating in the opening rotation direction indicated by the arrow in FIG. 16B, and the second arm 16 starts rotating in the opening rotation direction when the first arm 15 rotates.

Next, when a force sliding the upper case 1 in the opening slide direction is continuously exerted on the upper case 1 in the state where the first and second arms 15 and 16 start rotating in the opening rotation direction, as described above, the first and second arms 15 and 16 stand, and the upper case 1 stands at a rotation angle of substantially 45 degrees with respect to the lower case 2.

As described above, in the portable phone according to the sixth embodiment, since the slide rotation mechanism 11 includes the rotation assistance member having the rotation push-up member 70, the kick member 72, and the projecting block 73, the first arm 15 (and the second arm 16) easily rotate in the opening rotation direction using the rotation assistance member. Accordingly, even though the installation angles of the first and second arms 15 and 16 in the closed state of the portable phone are smaller than 45 degrees, it is possible to smoothly transit the upper case 1 from sliding in the opening slide direction to rotating in the opening rotation direction.

In addition, since the upper case 1 can be smoothly transited from sliding in the opening slide direction to rotating in the opening rotation direction by the rotation assistance member, the installation angles of the first and second arms 15 and 16 in the closed state of the portable phone can be set to be smaller than 45 degrees. Accordingly, thinning of the case of the portable phone can be implemented. That is to say, although the case is thinned, it is possible to provide a portable phone which allows the upper case 1 to smoothly slide in the opening slide direction and smoothly rotate in the opening rotation direction.

Modified Example

The embodiments described above are examples which apply the invention to the portable phone. However, the invention may be applied to a PHS (Personal Handyphone System) phone, a PDA (Personal Digital Assistant) device, a portable game machine, a portable music player, and the like. In any case, the effects described above can be achieved.

The present application contains subject matter related to that disclosed in Japanese Priority Patent Application JP 2010-001596 filed in the Japan Patent Office on Jan. 6, 2010, and Japanese Priority Patent Application JP 2010-141074 filed in the Japan Patent Office on Jun. 21, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A slide rotation device comprising:
a rail portion that is provided along a sliding direction of an upper case;
a slide mechanism that has a slide assistance plate sliding the upper case along the rail portion of the upper case; and
a rotation mechanism that is provided to be fixed to a vicinity of one end portion of a lower case and rotatably supports the slide assistance plate using a rotation shaft positioned in an extending direction of the slide assistance plate,
wherein in an opening operation, a force in an opening slide direction is exerted on the upper case in a state where the upper case and the lower case overlap each other so as to slide the upper case in the opening slide direction via the rail portion and the slide assistance plate, and one end portion of the upper case comes in contact with the slide assistance plate, and, in this state, a force in the opening slide direction is exerted on the upper case to rotate the slide assistance plate in an opening rotation direction using the rotation mechanism, and thereby the upper case stands at a predetermined rotation angle with respect to the lower case via the slide assistance plate, and
wherein in a closing operation, a force in a closing rotation direction reverse to the opening rotation direction is exerted on the upper case to put the upper case, which stands at a predetermined rotation angle with respect to the lower case, to be substantially parallel to the lower case using the rotation mechanism, and, in this state, a force in a closing slide direction reverse to the opening slide direction is exerted on the upper case to slide the upper case in the closing slide direction via the rail portion and the slide assistance plate, and thereby the upper case and the lower case overlap each other, wherein
the rotation mechanism comprises:
an arm connection member that is fixed to the slide assistance plate;
a first arm that is rotatably connected to the arm connection member and the lower case; and
a second arm that has an overall-length greater than an overall-length of the first arm by a predetermined length and is rotatably connected to the arm connection member and the lower case.

2. The slide rotation device according to claim 1, wherein the rotation mechanism further comprises:
a fastening member that is fixed to the slide assistance plate;
a free stop hinge portion that adjusts a rotation angle of the slide assistance plate to a predetermined rotation angle via the fastening member; wherein
the arm connection member is provided with the fastening member and the free stop hinge portion.

3. The slide rotation device according to claim 1, further comprising a rotation assistance portion that assists the rotating of the upper case in the opening rotation direction by converting a force sliding in the opening slide direction into a force rotating in the opening rotation direction when the upper case is slid in the opening slide direction.

4. The slide rotation device according to claim 3, wherein the rotation assistance portion comprises:
a contact projecting portion that projects toward the upper case and is provided to be fixed to the first arm; and
a projecting block that is provided in the upper case to come in contact with the contact projecting portion fixed to the first arm when the upper case is slid in the opening slide direction,
wherein in the opening operation, immediately before converting the sliding in the opening slide direction into the rotating in the opening rotation direction in the upper case, the projecting block which slides along with the upper case comes in contact with the contact projecting portion fixed to the first arm, and when the contact projecting portion is pressed in the opening slide direction, a force sliding in the opening slide direction is converted into a force rotating in the opening rotation direction, thereby assisting the rotating of the upper case in the opening rotation direction.

5. The slide rotation device according to claim 3, wherein the rotation assistance portion comprises:
a projecting block that is provided to be fixed to the upper case;
a kick member that is provided on a sliding path of the projecting block in the opening operation; and
a contact projecting portion that projects toward the upper case and is provided to be fixed to the first arm to come in contact with the kick member when the kick member is slid in the opening slide direction,
wherein in the opening operation, the projecting block which slides along with the upper case comes in contact with the kick member to slide the kick member in the opening slide direction such that the kick member slides in the opening slide direction and presses the contact projecting portion in the opening slide direction, thereby converting a force sliding in the opening slide direction into a force rotating in the opening rotation direction to assist the rotating of the upper case in the opening rotation direction.

6. The slide rotation device according to claim 1, further comprising a rotation assistance portion that assists the rotating of the upper case in the opening rotation direction by moving toward the upper case due to a force sliding in the opening slide direction and pushing up the upper case when the upper case is slid in the opening slide direction.

7. The slide rotation device according to claim 6, wherein the rotation assistance portion comprises:

a projecting block that is provided to be fixed to the upper case to project toward the lower case; and a rotation kick member that is provided in the lower case to have a rotation shaft which is positioned in an extending direction of the slide assistance plate, wherein in the opening operation, the rotation kick member is rotated about the rotation shaft due to a force sliding in the opening slide direction by the projecting block which slides along with the upper case such that the upper case is pushed up by the rotation kick member, thereby assisting the rotating of the upper case in the opening rotation direction.

8. The slide rotation device according to claim 7, further comprising a kick member that is provided on a sliding path of the projecting block in the opening operation, wherein in the opening operation, the projecting block which slides along with the upper case in the opening slide direction comes in contact with the kick member to transmit a force sliding in the opening slide direction by the projecting block to the rotation kick member via the kick member, rotate the rotation kick member about the rotation shaft, and push up the upper case, thereby assisting the rotating of the upper case in the opening rotation direction.

9. The slide rotation device according to claim 6, wherein the rotation assistance portion comprises:

a projecting block that is provided to be fixed to the upper case to project toward the lower case;

a kick member that is provided on a sliding path of the projecting block in the opening operation; and a push-up member that is provided in the lower case and moves toward the upper case due to a force sliding in the opening slide direction by the projecting block which slides along with the upper case during the opening operation to slide in the opening slide direction, wherein in the opening operation, the projecting block that slides along with the upper case in the opening slide direction comes in contact with the kick member to slide the kick member in the opening slide direction such that the kick member slides in the opening slide direction and moves the push-up member toward the upper case to push up the upper case, thereby assisting the rotating of the upper case in the opening rotation direction.

10. A slide rotation method comprising:

providing a rail portion along a sliding direction of an upper case;

forming a slide mechanism that has a slide assistance plate sliding the upper case along the rail portion of the upper case; and providing a rotation mechanism that is fixed to a vicinity of one end portion of a lower case and rotatably supports the slide assistance plate using a rotation shaft positioned in an extending direction of the slide assistance plate, wherein in an opening operation, a force in an opening slide direction is exerted on the upper case in a state where the upper case and the lower case overlap each other to slide the upper case in the opening slide direction via the rail portion and the slide assistance plate, and one end portion of the upper case comes in contact with the slide assistance plate, and, in this state, a force in the opening slide direction is exerted on the upper case to rotate the slide assistance plate in an opening rotation direction using the rotation mechanism such that the upper case stands at a predetermined rotation angle with respect to the lower case via the slide assistance plate, and wherein in a closing operation, a force in a closing rotation direction reverse to the opening rotation direction is exerted on the upper case to put the upper case, which stands at a predetermined rotation angle with respect to the lower case, to be substantially parallel to the lower case using the rotation mechanism, and, in this state, a force in a closing slide direction reverse to the opening slide direction is exerted on the upper case to slide the upper case in the closing slide direction via the rail portion and the slide assistance plate such that the upper case and the lower case overlap each other, wherein the rotation mechanism comprises:

an arm connection member that is fixed to the slide assistance plate;

a first arm that is rotatably connected to the arm connection member and the lower case; and a second arm that has an overall-length greater than an overall-length of the first arm by a predetermined length and is rotatably connected to the arm connection member and the lower case, wherein in the opening operation, when a force in the opening slide direction is exerted on the upper case in a state where one end portion of the upper case comes in contact with the slide assistance plate, the first arm and the second arm are rotated in the opening rotation direction by the arm connection member fixed to the slide assistance plate to rotate the slide assistance plate in the opening rotation direction such that the upper case stands at a predetermined rotation angle with respect to the lower case via the slide assistance plate, and wherein in the closing operation, when a force in a closing rotation direction reverse to the opening rotation direction is exerted on the upper case, the first arm and the second arm are rotated in the closing rotation direction by the arm connection member fixed to the slide assistance plate to rotate the slide assistance plate in the closing rotation direction such that the upper case standing at a predetermined rotation angle with respect to the lower case is put to be substantially parallel to the lower case, and, in this state, a force in a closing slide direction reverse to the opening slide direction is exerted on the upper case to slide the upper case in the closing slide direction via the rail portion and the slide assistance plate such that the upper case and the lower case overlap each other.

11. A portable terminal device comprising:

a rail portion that is provided along a sliding direction of an upper case;

a slide mechanism that has a slide assistance plate sliding the upper case along the rail portion of the upper case; and a rotation mechanism that is provided to be fixed to a vicinity of one end portion of a lower case and rotatably supports the slide assistance plate using a rotation shaft positioned in an extending direction of the slide assistance plate, wherein in an opening operation, a force in an opening slide direction is exerted on the upper case in a state where the upper case and the lower case overlap each other so as to slide the upper case in the opening slide direction via the rail portion and the slide assistance plate, and one end portion of the upper case comes in contact with the slide assistance plate, and, in this state, a force in the opening slide direction is exerted on the upper case to rotate the slide assistance plate in an opening rotation direction using the rotation mechanism, and thereby the upper case stands at a predetermined rotation angle with respect to the lower case via the slide assistance plate, and wherein in a closing operation, a force in a closing rotation direction reverse to the opening rotation direction is exerted on the upper case to put the upper case, which stands at a predetermined rotation angle with respect to the lower case, to be substantially parallel to the lower case using the rotation mechanism, and, in this state, a force in a closing slide direction reverse to the opening slide direction is exerted on the upper case to slide the upper case in the closing slide direction via the rail portion and the slide assistance plate, and thereby the upper case and the lower case overlap each other, wherein the rotation mechanism comprises:
   an arm connection member that is fixed to the slide assistance plate;
   a first arm that is rotatably connected to the arm connection member and the lower case; and
   a second arm that has an overall-length greater than an overall-length of the first arm by a predetermined length and is rotatably connected to the arm connection member and the lower case.

\* \* \* \* \*